US008774398B2

(12) United States Patent
Abe et al.

(10) Patent No.: US 8,774,398 B2
(45) Date of Patent: Jul. 8, 2014

(54) TRANSCEIVER

(71) Applicant: Panasonic Corporation, Osaka (JP)

(72) Inventors: Kazutaka Abe, Osaka (JP); Shuji Miyasaka, Osaka (JP); Seigo Suguta, Nara (JP); Hiroshi Taniuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/081,776

(22) Filed: Nov. 15, 2013

(65) Prior Publication Data

US 2014/0072118 A1 Mar. 13, 2014

Related U.S. Application Data

(63) Continuation of application No. PCT/JP2012/003174, filed on May 15, 2012.

(30) Foreign Application Priority Data

May 20, 2011 (JP) .................................. 2011-113997
Jul. 4, 2011 (JP) .................................. 2011-148697

(51) Int. Cl.
*H04M 9/08* (2006.01)

(52) U.S. Cl.
USPC ................................ 379/406.01; 379/102.03

(58) Field of Classification Search
USPC ........... 379/406.01–406.16, 102.03; 455/132, 455/137
See application file for complete search history.

(56) References Cited

U.S. PATENT DOCUMENTS 7,224,794 B1 *  5/2007 Davis et al. .............. 379/388.01
7,409,142 B2 *  8/2008 Hirai ............................ 386/252
8,253,772 B2 *  8/2012 Book .......................... 348/14.01
8,676,273 B1 *  3/2014 Fujisaki ....................... 455/567
2010/0073455 A1   3/2010 Iwabuchi et al.
2010/0272251 A1  10/2010 Banba et al.
2011/0281617 A1 * 11/2011 Kim et al. ................. 455/556.1

FOREIGN PATENT DOCUMENTS

JP  2008-219240 A   9/2008
JP  2010-258941 A  11/2010
JP  2011-205353 A  10/2011

OTHER PUBLICATIONS

Juro Ohga, Yoshio Yamasaki and Yutaka Kaneda, "Acoustic systems and digital technology" published by Institute of Electronics, Information and Communication Engineers with partial English Translation.

* cited by examiner

*Primary Examiner* — Simon Sing
(74) *Attorney, Agent, or Firm* — McDermott Will & Emery LLP

(57) ABSTRACT

A transceiver includes: a TV signal receiving unit for generating a first audio signal from a received broadcast wave; a decoder for decoding a reception signal received from the transceiver, to generate a second audio signal; an adding unit for transmitting the second audio signal to a speaker or adding up and transmit, to the speaker, the first audio signal and the second audio signal, and for outputting a reference signal; and an echo canceller for estimating a pseudo echo component from the reference signal, and cancels the pseudo echo component in a picked-up signal picked up by microphone a sound outputted from the speaker. The adding unit, when the TV signal receiving unit receives the broadcast wave, adds and transmits, to the speaker, the first audio signal and the second audio signal, and outputs a signal resulting from the addition as the reference signal to the echo canceller.

14 Claims, 17 Drawing Sheets

TRANSCEIVER

CROSS REFERENCE TO RELATED APPLICATIONS

This is a continuation application of PCT International Patent Application No. PCT/JP2012/003174 filed on May 15, 2012, designating the United States of America, which is based on and claims priority of Japanese Patent Applications No. 2011-113997 filed on May 20, 2011, and No. 2011-148697 filed on Jul. 4, 2011. The entire disclosures of the above-identified applications, including the specifications, drawings and claims are incorporated herein by reference in their entirety.

FIELD

The present invention relates to a transceiver on which an echo cancellation device is mounted.

BACKGROUND

There are transceivers such as mobile phones and teleconference systems. Some transceivers are implemented with a hand-free communication function enabling communication without a handset or headset.

A transceiver includes at least: a speaker for reproducing voice of a talker who is in a communication destination (hereinafter referred to as a far end); and a microphone for receiving voice of a talker who is in a communication dispatch point (hereinafter referred to as a near end) and transmitting the voice to the far end.

FIG. 9 is a diagram which illustrates a configuration of a communication system using a conventional transceiver.

The communication system illustrated in FIG. 9 includes: a transceiver 900 which is located at the near end and is used by a talker of a communication dispatch point; a transceiver 920 which is located at the far end and is used by a talker of a communication destination; and a communication network 930 used for receiving and transmitting sound of the transceiver 900 and the transceiver 920.

The transceiver 900 includes: a decoder 901; a speaker 903; a microphone 904; an echo canceller 905; and an encoder 906. Likewise, the transceiver 920 includes: a decoder 921; a speaker 923; a microphone 924; an echo canceller 925; and an encoder 926.

Here, the case will be described where the echo canceller 905 and the echo canceller 925 are not included in the communication system. In this case, during a communication, the voice of the far-end transceiver 920 is emitted from the speaker 903 of the near-end transceiver 900, and the sound is received by the microphone 904 of the near-end transceiver 900 and transmitted again to the far-end transceiver 920.

At the far-end transceiver 920, the voice uttered by the far-end talker is outputted from the speaker 923 of the far-end talker (the transceiver 920), and this is heard as an echo. This is annoying when the far-end talker talks. The same holds true for the near-end transceiver 900. The voice uttered by the near-end talker is heard as an echo from the speaker 903 of the near-end talker (the transceiver 900).

In addition, the sound received by the microphone 904 of the near-end transceiver 900 returns to the near-end transceiver 900 again and is outputted from the speaker 903 (closed loop), in such a manner as in: the near-end transceiver 900—the far-end transceiver 920—the near-end transceiver 900. When the acoustic frequency characteristics in the closed loop include a frequency of a gain larger than one, a continuous loud sound called howling is emitted from the speaker 903 with the frequency. This not only is tremendously annoying to the near-end talker but also can break the speaker 903 in some cases. For that reason, such transceivers (the transceiver 900 and the transceiver 920) are provided with the echo canceller 905 and the echo canceller 925 for preventing the occurrence of echo or howling.

The echo canceller 905, for example, identifies the audio characteristics in a path from the speaker 903 in the near-end transceiver 900 trough a space to the microphone 904. Then, by utilizing the identified audio characteristics and a signal transmitted to the speaker 903, it is possible to electrically estimate a signal which is to be outputted as a sound from the speaker 903 and reaches the microphone 904. Here, the signal which is estimated is called pseudo echo. By subtracting the pseudo echo from a signal which is actually received by the microphone 904, it is possible to prevent a signal transmitted from the far-end transceiver 920 returns the far end again as echo via the speaker 903 of the near-end transceiver 900 and the microphone 904. It is to be noted that the same holds true for the echo canceller 925, and thus description for that will be omitted.

Non Patent Literature (NPT) 1 discloses the techniques of the echo cancellation and suppressing of howling.

However, the above-described pseudo echo needs to be generated before a sound (audio signal) emitted from, for example, the speaker 903 reaches the microphone 904. This means that, when a sound is received by the microphone 904, for some reason, before pseudo echo is generated, the pseudo echo for the sound cannot be estimated, and thus echo cannot be canceled. One example is that the case where the far-end transceiver 920 and the near-end transceiver 900 receive the same sound. The following describes that with reference to FIG. 10.

FIG. 10 is a diagram for explaining a problem in a communication system in which a conventional transceiver is used. It is to be noted that elements identical to elements in FIG. 9 are provided with the same reference signs, and detailed explanation will be omitted.

FIG. 10 illustrates the case where there are a TV receiver 1000 which is a different casing from the near-end transceiver 900 and is located near the transceiver 900 and a TV receiver 1020 which is a different casing from the far-end transceiver 920 and is located near the transceiver 920, the TV receiver 1000 and the TV receiver 1020 receive broadcast waves, and both of a near-end talker and a far-end talker view the same TV program.

Here, in FIG. 10, a sound emitted from the TV receiver 1020 located near the far-end transceiver 920 is received by the microphone 924 of the far-end transceiver 920. In the same manner as above, a sound emitted from the TV receiver 1000 located near the near-end transceiver 900 is received by the microphone 904 of the near-end transceiver 900.

The sound emitted from the far-end TV receiver 1020 is received by the microphone 924 of the far-end transceiver 920, transmitted to the near-end transceiver 900 as an audio signal of the transceiver 920 together with a sound uttered by the far-end talker, and inputted to the echo canceller 905 of the near-end transceiver 900.

At this time, the same sound is emitted from the TV receiver 1000 in the near-end transceiver 900. However, under normal conditions, by the time a TV sound of the TV receiver 1020 which is received by the microphone 924 of the far-end transceiver 920 reaches the echo canceller 905 of the near-end transceiver 900, a TV sound of the TV receiver 1000 already reaches the microphone 904.

This means that the TV sound of the TV receiver 1000 cannot be canceled by the pseudo echo estimated from the TV sound of the TV receiver 1020 included in the audio signal of the transceiver 920 which is inputted into the echo canceller 905. As a result, the TV sound is transmitted to the far-end transceiver 920, and an annoying echo occurs.

A counter measure against the above-described problem is disclosed by PTL 1, for example. Patent Literature (PTL) 1 discloses in Embodiment 1 a method of performing echo cancellation for each of a TV sound which reaches the near end from the far end, a TV sound generated in the near end, and a sound of a far-end talker, when the TV receiver is a different casing. In addition, Patent Literature (PTL) 1 discloses in Embodiment 2 a method of performing echo cancellation for the TV sound which reaches the near end from the far end, the TV sound generated in the near end, and the sound of a far-end talker, when the TV receiver and the transceiver are integrated.

CITATION LIST

Patent Literature

[PTL 1] Japanese Unexamined Patent Application Publication No. 2010-258941

Non Patent Literature

[NPL 1] "Acoustic systems and digital technology" published by Institute of Electronics, Information and Communication Engineers, Juro OHGA, Yoshio YAMASAKI, Yutaka KANEDA

SUMMARY

Technical Problem

However, according to the above-described techniques disclosed by PTL 1, echo cancellation is always performed on the TV sound regardless of whether or not a broadcast wave is received by the far-end TV receiver 1020 and the near-end TV receiver 1000. This means that echo estimation is always performed even unnecessarily when a broadcast wave is not received, leading to a problem of large power consumption.

In addition, the sampling frequency and the number of channels usually differ between a talk sound and a TV sound. In general, the talk sound is lower quality and the TV sound is higher quality. This is not taken into consideration in the above-described PTL 1, and thus there is a problem that not only unnecessarily power is consumed but also TV sound quality is deteriorated in some cases.

In view of the above, the present invention provides a transceiver which avoids performing unnecessarily echo estimation when a broadcast wave is not received and is capable of reducing the power consumption.

Solution to Problem

In order to solve the above-described problems, a transceiver according to an aspect of the present invention is a transceiver including at least a speaker and a microphone, the transceiver including: a receiving unit which receives a broadcast wave and generate a first audio signal from the received broadcast wave; a decoding unit which decodes a reception signal received from a different transceiver, to generate a second audio signal; an adding unit which (i-a) transmits the first audio signal or the second audio signal to the speaker or (i-b) adds up and transmit, to the speaker, the first audio signal and the second audio signal, and (ii) outputs a reference signal; and an echo canceller which estimates a pseudo echo component from the reference signal and cancels the pseudo echo component in a picked-up signal obtained by picking up, using the microphone, a sound outputted from the speaker, wherein when the receiving unit is receiving the broadcast wave, the adding unit is which adds up and transmit, to the speaker, the first audio signal and the second audio signal, and output, to the echo canceller, a signal resulting from adding up the first audio signal and the second audio signal as the reference signal.

According to this configuration, when the receiving unit receives a broadcast wave, echo cancellation can be performed such that a sound of the broadcast wave (TV) of a near-end transceiver is not transmitted to a different transceiver which is located at a far end. In addition, when the receiving unit does not receive a broadcast wave, there is no need to perform the echo cancellation. It is therefore possible to avoid performing unnecessary echo estimation when a broadcast wave is not received and to implement a transceiver which is capable of reducing power consumption.

In addition, the transceiver may further include a control unit which controls the adding unit, and when the receiving unit is receiving the broadcast wave and the different transceiver is receiving a same broadcast wave as the broadcast wave, the control unit may cause the adding unit to: adds up and transmit, to the speaker, the first audio signal and the second audio signal; and outputs, to the echo canceller, the signal resulting from adding up the first audio signal and the second audio signal as the reference signal, and when the receiving unit is receiving the broadcast wave and the different transceiver is receiving a broadcast wave different from the broadcast wave, or when the receiving unit is receiving the broadcast wave and the different transceiver is not receiving a broadcast wave, the control unit may cause the adding unit to: add up and transmit, to the speaker, the first audio signal and the second audio signal; and output the second audio signal to the echo canceller as the reference signal.

According to this configuration, it is possible to select whether or not to transmit the broadcast wave (TV) received by the near-end transceiver to the far-end different transceiver, depending on whether or not the near-end transceiver and the far-end different transceiver receive the same broadcast wave. Accordingly, since unnecessary echo estimation is not performed when the near-end transceiver and the far-end different transceiver receive different broadcast waves, it is possible to implement a transceiver which is capable of reducing power consumption.

In addition, the control unit may determine, based on an identifying signal of the broadcast wave being received by the receiving unit, whether or not the receiving unit is receiving the broadcast wave, and the control unit may determine, based on an identifying signal of the broadcast wave being received by the different transceiver, whether or not the different transceiver is receiving a same broadcast wave as the broadcast wave being received by the receiving unit.

According to this configuration, it is possible to automatically determine whether or not the near-end transceiver and the far-end different transceiver receive the same broadcast wave.

In addition, the adding unit may, when the receiving unit is receiving the broadcast wave and the different transceiver is receiving a same broadcast wave as the broadcast wave, (i) add up and transmit, to the speaker, the first audio signal and the second audio signal by converting a sampling frequency of the first audio signal to obtain a signal having a sampling frequency of the second audio signal, and then adding the signal to a signal having the sampling frequency of the second audio signal, and (ii) output a signal resulting from adding up the first audio signal converted into the signal having the sampling frequency of the second audio signal and the second audio signal, to the echo canceller as the reference signal, and when the receiving unit is receiving the broadcast wave and the different transceiver is receiving a broadcast wave different from the broadcast wave, or when the receiving unit is receiving the broadcast wave and the different transceiver is not receiving a broadcast wave, (i) add up and transmit, to the speaker, the first audio signal and the second audio signal by converting a sampling frequency of the second audio signal to obtain a signal having a sampling frequency of the first audio signal, and then adding the signal to a signal having the sampling frequency of the first audio signal, and (ii) output the second audio signal converted into the signal having the sampling frequency of the first audio signal, to the echo canceller as the reference signal.

According to this configuration, there is an advantageous effect that it is also possible not to transmit the broadcast wave (TV) received by the near-end transceiver to the far-end different transceiver, and when there is no problem in transmitting the sound of the broadcast wave (TV) to the far-end different transceiver, the sound can be received with a high audio quality (high sampling frequency) of the original broadcast wave (TV).

In addition, the adding unit may: when the receiving unit is receiving the broadcast wave and the different transceiver is receiving a same broadcast wave as the broadcast wave, (i) add up and transmit, to the speaker, the first audio signal and the second audio signal by converting the number of channels of the first audio signal to obtain a signal having the number of channels of the second audio signal, and then adding the signal to a signal having the number of channels of the second audio signal, and (ii) output a signal resulting from adding up the first audio signal converted into the signal having the number of channels of the second audio signal and the second audio signal, to the echo canceller as the reference signal; and when the receiving unit is receiving the broadcast wave and the different transceiver is receiving a broadcast wave different from the broadcast wave, or when the receiving unit is receiving the broadcast wave and the different transceiver is not receiving a broadcast wave, (i) add up and transmit, to the speaker, the first audio signal and the second audio signal by converting the number of channels of the second audio signal to obtain a signal having the number of channels of the first audio signal, and then adding the signal to a signal having the number of channels of the first audio signal, and (ii) output the second audio signal converted into the signal having the number of channels of the first audio signal, to the echo canceller as the reference signal.

According to this configuration, there is an advantageous effect that it is also possible not to transmit the broadcast wave (TV) received by the near-end transceiver to the far-end different transceiver, and when the sound of the broadcast wave (TV) may be transmitted to the far-end different transceiver, the sound can be received with a high audio quality (many channels) of the original broadcast wave (TV).

In order to solve the above-described problems, a transceiver according to an aspect of the present invention is a transceiver including at least a speaker and a microphone, the transceiver including: a receiving unit which receives a broadcast wave and generate a first audio signal from the received broadcast wave; a decoding unit which decodes a reception signal received from a different transceiver, to generate a second audio signal; an adding unit which adds up, and transmits to the speaker, the first audio signal and the second audio signal, and output a reference signal; and an echo canceller which estimates a pseudo echo component from the reference signal and cancels the pseudo echo component in a picked-up signal obtained by picking up, using the microphone, a sound outputted from the speaker, wherein the adding unit includes a first sound volume adjusting unit which adjusts a sound volume of the first audio signal, and a second sound volume adjusting unit which adjusts a sound volume of the second audio signal, and when the receiving unit is receiving the broadcast wave and outputs the second audio signal to the echo canceller as the reference signal, the adding unit adds up, and transmits to the speaker, the second audio signal and the first audio signal having an output level lower than an output level of the second audio signal, by lowering the output level of the first sound volume adjusting unit to be lower than the output level of the second sound volume adjusting unit.

Here, the output level of the first sound volume adjusting unit may be 0.

According to this configuration, it is possible to avoid performing unnecessary echo estimation when a broadcast wave is not received and to implement a transceiver which is capable of reducing power consumption. In addition, even when the broadcast wave is received, it is possible to perform echo estimation placing priority on talk volume. More specifically, when receiving of the broadcast wave (TV) and communication are performed at the same time using the near-end transceiver, an advantageous effect of preferentially outputting the sound of communication placing priority on talk volume.

In order to solve the above-described problems, a transceiver according to an aspect of the present invention is a transceiver including at least a speaker and a microphone which picks up at least a first audio signal when a receiver for receiving a broadcast wave outputs the first audio signal, the transceiver including: a decoding unit which decodes a reception signal received from a different transceiver, to generate a second audio signal; a first echo canceller which estimates a first pseudo echo component from a first reference signal, and cancels the first pseudo echo component in a picked-up signal obtained by picking up, using the microphone, a sound outputted from at least the speaker; and a second echo canceller which estimates a second pseudo echo component, using, as a second reference signal, the picked-up signal in which the first pseudo echo component is canceled by the first echo canceller, and cancels the second pseudo echo component in the second audio signal, wherein when the different transceiver picks up an audio signal outputted from a different receiver which receives a broadcast wave, the decoding unit which generates the second audio signal including a third audio signal of the different transceiver, the first echo canceller cancels the first pseudo echo component in a picked-up signal obtained by picking up, using the microphone, a sound outputted from the speaker and the first audio signal outputted from the receiver, the second echo canceller cancels the second pseudo echo component in the second audio signal, the second pseudo echo component including the third audio signal of the different transceiver, and the first reference signal is the second audio signal in which the second pseudo echo component is cancelled by the second echo canceller.

Here, it is preferable that, when the different transceiver picks up an audio signal outputted from a receiver which receives a same broadcast wave as the broadcast wave, the second audio signal is substantially identical to the first audio signal.

According to this configuration, even when the receiver which receives the broadcast wave and the transceiver are different casings and an audio signal of the broadcast wave (TV) cannot be added to a reference signal, it is possible to cancel, at the near end, the sound of the broadcast wave (TV) from the far end when the near-end transceiver and the far-end different transceiver receive the program of the same broadcast wave (TV).

It is therefore possible to avoid performing unnecessary echo estimation when a broadcast wave is not received and to implement a transceiver which is capable of reducing power consumption.

In order to solve the above-described problems, a transceiver according to an aspect of the present invention is a transceiver including at least a speaker and a microphone, the transceiver including: a receiving unit which receives an input of an audio stream and generate a first audio signal from the audio stream; a decoding unit which decodes a reception signal received from a different transceiver, to generate a second audio signal; an adding unit which (i-a) transmits the first audio signal or the second audio signal to the speaker or (i-b) adds up and transmits, to the speaker, the first audio signal and the second audio signal, and (ii) outputs a reference signal; and an echo canceller which estimates a pseudo echo component from the reference signal and cancels the pseudo echo component in a picked-up signal obtained by picking up, using the microphone, a sound outputted from the speaker, wherein when the receiving unit is receiving the audio stream, the adding unit adds up, and transmit to the speaker, the first audio signal and the second audio signal, and output a signal resulting from adding up the first audio signal and the second audio signal, to the echo canceller as the reference signal.

In order to solve the above-described problems, an echo cancellation device according to an aspect of the present invention is An echo cancellation device which transmits an audio signal to a speaker and receives an input of a picked-up signal which is picked up by a microphone, the echo cancellation device including: a receiving unit which receives a broadcast wave and generate a first audio signal from the received broadcast wave; a decoding unit which decodes a reception signal received from a different transceiver, to generate a second audio signal; an adding unit which (i-a) transmits the first audio signal or the second audio signal to the speaker or (i-b) add up, and transmit to the speaker, the first audio signal and the second audio signal, and (ii) outputs a reference signal; and an echo canceller which estimates a pseudo echo component from the reference signal and cancels the pseudo echo component in a picked-up signal obtained by picking up, using the microphone, a sound outputted from the speaker, wherein when the receiving unit is receiving the broadcast wave, the adding unit is which adds up, and transmits to the speaker, the first audio signal and the second audio signal, and outputs a signal resulting from adding up the first audio signal and the second audio signal, to the echo canceller as the reference signal.

Advantageous Effects

According to the present invention, it is possible to avoid performing unnecessary echo estimation when a broadcast wave is not received and to implement a transceiver which is capable of reducing power consumption.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Embodiment 1

Embodiment 1

The following explains, with reference to the diagrams, a transceiver according to Embodiment 1 of the present invention.

Figure 1A:
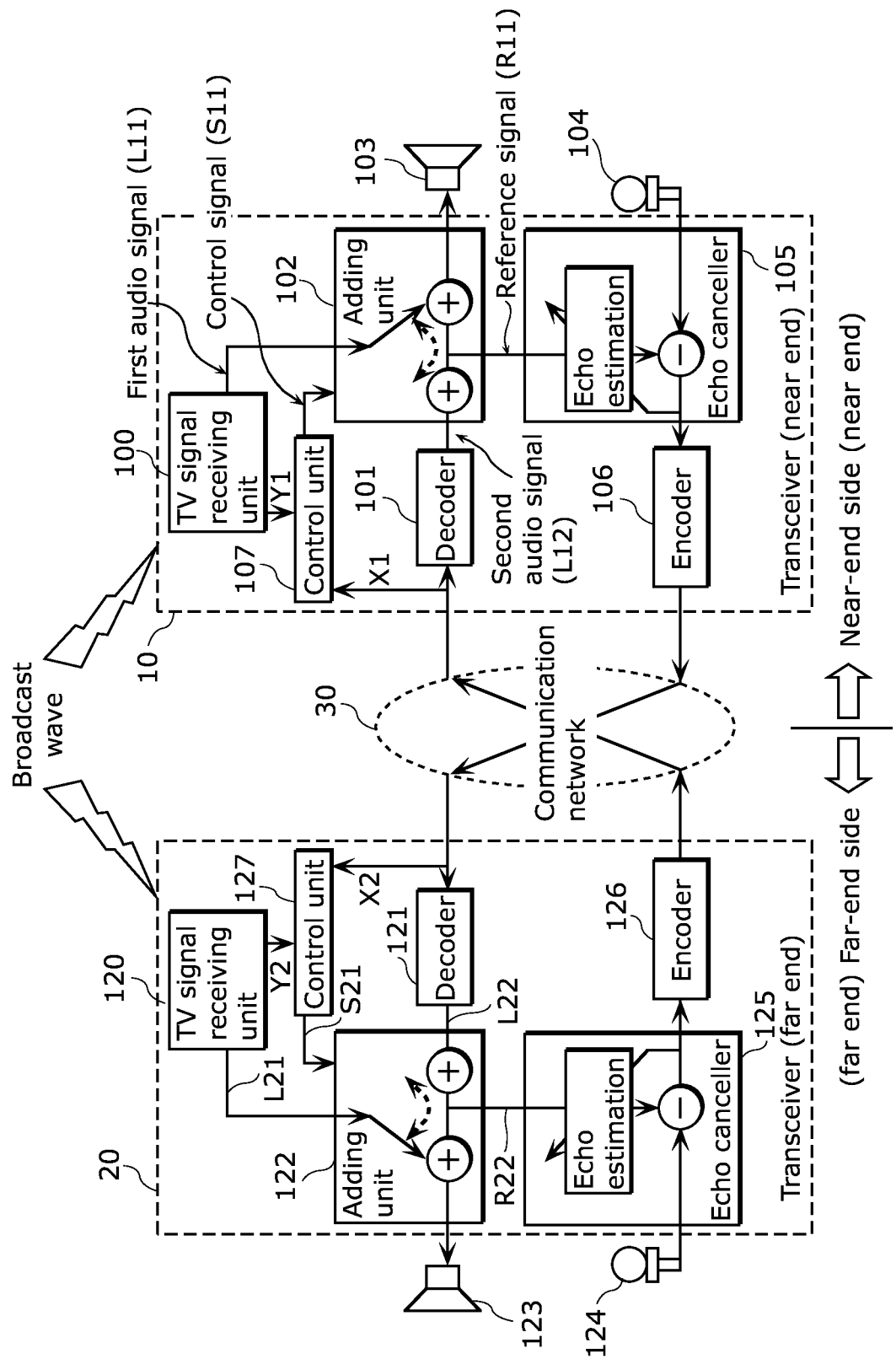
FIG. 1A is a diagram which illustrates an example of a configuration of a communication system according to Embodiment 1 of the present invention.
Figure 1B:
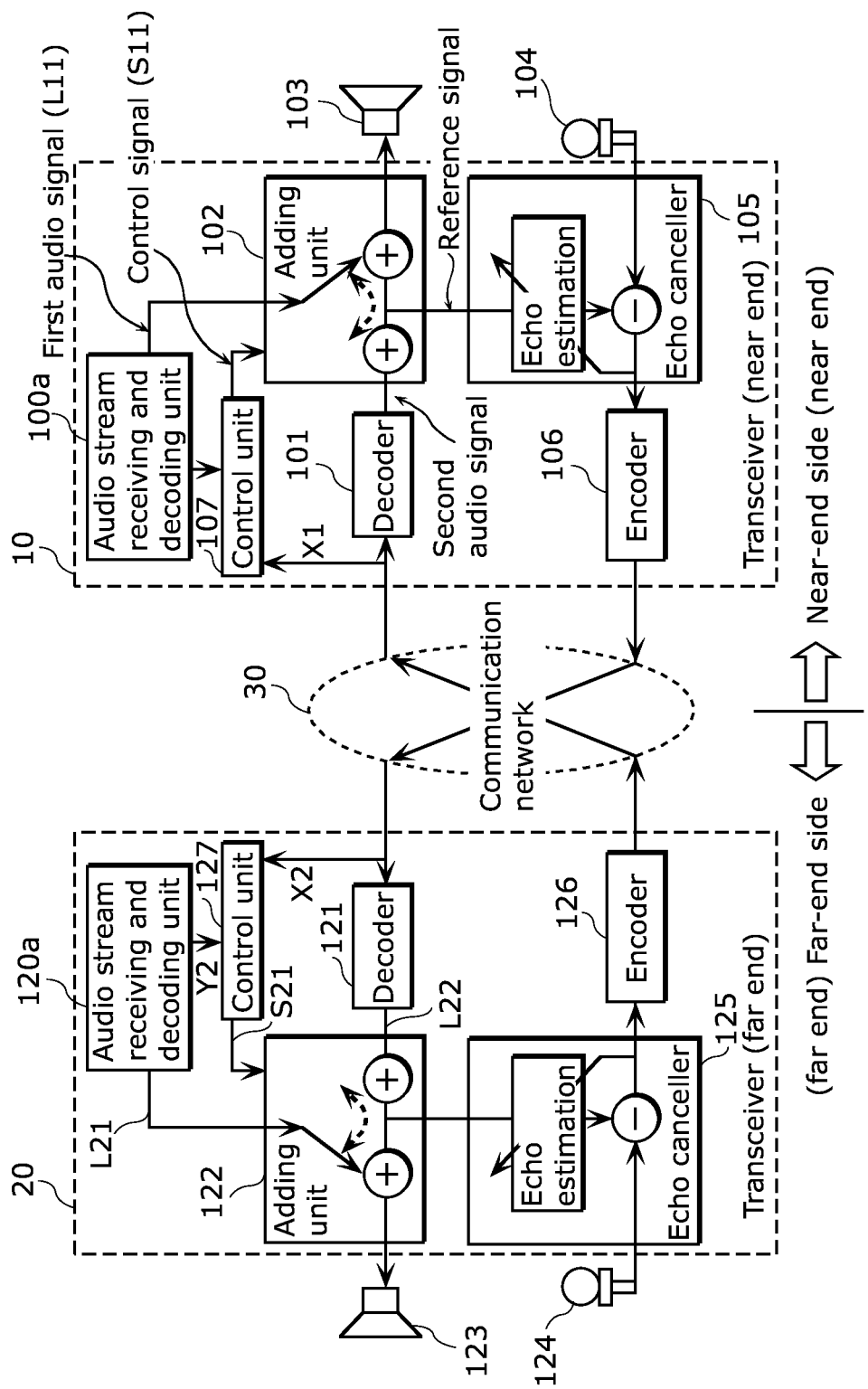
FIG. 1B is a diagram which illustrates an example of a configuration of the communication system according to Embodiment 1 of the present invention.

FIG. 1A and FIG. 1B are diagrams each of which illustrates an example of a configuration of a communication system according to Embodiment 1 of the present invention.

The communication system illustrated in FIG. 1A includes: a transceiver 10 which is located at the near end and is used by a talker of a communication dispatch point; a transceiver 20 which is located at the far end and is used by a talker of a communication destination; and a communication network 30 used for receiving and transmitting a sound of the transceiver 10 and the transceiver 20.

The transceiver 10 includes: a TV signal receiving unit 100; a decoder 101; an adding unit 102; a speaker 103; a microphone 104; an echo canceller 105; an encoder 106; and a control unit 107.

The TV signal receiving unit 100 is an example of a receiving unit according to the present invention, and when receiving a broadcast wave (TV signal), generates a first audio signal from a received broadcast wave (TV signal). More specifically, the TV signal receiving unit 100 receives a TV signal from a broadcast wave to generate a first audio signal L11. Here, the audio signal of the TV signal included in the recent broadcast waves is a multichannel signal (e.g., 2 channel signal or 5.1 channel signal) of a broadband (e.g., 32 kHz or 48 kHz).

It is to be noted that, as illustrated in FIG. 1B, an audio stream inputted through a communication network may be received and decoded by an audio stream receiving and decoding unit 100a, instead of the TV signal receiving unit 100. In the same manner as the above, the audio stream receiving and decoding unit 100a generates the first audio signal L11 in this case as well. The audio stream receiving and decoding unit 100a may receive an input of an audio stream resulting from decoding a video and audio multiple stream which is broadcast live on TV, or may receive an input of an audio stream included in the Internet and radio broadcast which includes only audio. However, it is not limited to this, and any audio stream which is inputted through the communication network can be processed in the same manner.

The decoder 101 is an example of a decoding unit according to the present invention, and decodes a reception signal which is received from a different transceiver to generate a second audio signal. More specifically, the decoder 101 receives a reception signal transmitted from the far-end transceiver 20 via the communication network 30, and generates the second audio signal L12. Here, a signal for use in the communication is conventionally a narrowband signal of approximately 8 kHz, however, the signal in recent years increasingly has a relatively broadband such as 16 kHz and 24 kHz. However, it is still narrowband compared to the audio signals of television. In addition, the communication signal is generally a monaural signal.

The control unit 107 is an example of a control unit according to the present invention, and controls the adding unit 102. More specifically, the control unit 107 receives a signal (Y1) indicating whether or not the TV signal receiving unit 100 receives a signal, and a signal (X1) indicating whether or not the decoder 101 receives a reception signal, and generate a control signal S11 for controlling an operation of the adding unit 102.

In addition, the control unit 107, when the TV signal receiving unit 100 receives a broadcast wave (TV signal) and when the decoder 101 decodes a reception signal received from a different transceiver, causes the adding unit 102 to (i) add up the first audio signal L11 and the second audio signal L12, (ii) transmit a signal resulting from adding up the first audio signal L11 and the second audio signal L12 to the speaker 103, and (iii) output the signal resulting from adding up the first audio signal L11 and the second audio signal L12 to the echo canceller 105. In addition, the control unit 107, when the TV signal receiving unit 100 receives a broadcast wave (TV signal) and when the decoder 101 does not decode a reception signal received from a different transceiver, turns a switch in the adding unit 102 to the right to directly transmit the first audio signal L11 to the speaker 103 and transmit nothing to the echo canceller 105. In this case, the adder positioned to the right in the adding unit 102 is, of course, unnecessary.

The adding unit 102 is an example of an adding unit according to the present invention. The adding unit 102 (i) transmits the first audio signal or the second audio signal to the speaker 103, or (ii) adds up the first audio signal and the second audio signal and transmits the resultant signal to the speaker 103, as well as outputting a reference signal. In addition, the adding unit 102, when the TV signal receiving unit 100 receives a broadcast wave (TV signal), adds up, and transmit to the speaker 103, the first audio signal and the second audio signal, and outputs, to the echo canceller 105, a signal resulting from the adding up of the first audio signal and the second audio signal as a reference signal R11. More specifically, the adding unit 102, in response to the control signal S11, outputs, to the speaker 103, the second audio signal L12 or a signal which is obtained by adding up the first audio signal L11 and the second audio signal L12. At the same time, the adding unit 102 outputs, to the echo canceller 105, a reference signal R11 of an echo signal that will be described later. Here, how to add up the first audio signal L11 and the second audio signal L12, or how to generate the reference signal R11 from the first audio signal L11 and the second audio signal L12 which are added up is controlled by the control signal S11. This will later be explained with reference to FIG. 2, and thus explanation for that will here be omitted.

The speaker 103 converts an output signal transmitted from the adding unit 102 into a spatial audio signal. Then, the speaker 103 converts the spatial audio signal obtained from the conversion, into physical vibration accordingly, and outputs a sound.

The microphone 104 picks up a sound and converts the picked-up sound into an electric signal. More specifically, the microphone 104 receives a spatial audio signal including the audio signal from the speaker 103, and converts the audio signal into an electric signal. Here, the audio signal outputted from the speaker 103 is picked up by the microphone 104 directly or indirectly by reflecting off a wall and the like. The audio signal picked up by the microphone 104 becomes an echo and transmitted to the far-end transceiver 20 if any processing is not performed. The echo canceller 105 suppresses the audio signal to become an echo.

The echo canceller 105 is an example of an echo canceller according to the present invention, estimates a pseudo echo component from the reference signal R11, and cancels the pseudo echo component in the picked-up signal which is obtained by picking up, by the microphone 104, the sound outputted from the speaker 103. More specifically, the echo canceller 105 receives inputs of the output signal from the microphone 104 and the reference signal R11, and estimates the pseudo echo component based on the reference signal R11. In addition, the echo canceller 105 cancels the pseudo echo component in the signal which is picked up by the microphone 104. In other words, the echo canceller 105 estimates a pseudo echo based on a signal component included in the reference signal R11 and a signal component of the signal picked up together with echo, thereby canceling echo from the signal picked up together with echo.

Here, among the signals outputted from the speaker 103, a signal to be canceled by the echo canceller 105 needs to be included in the reference signal R11, and a signal which is not necessary to be canceled does not have to be included in the reference signal R11. This relates to an operation performed by the adding unit 102 which will be described later. It is to be noted that, according to the exemplary embodiment, the echo canceller 105 may be any echo cancelling means known conventionally.

Then, the echo canceller 105 outputs, to the encoder 106, a signal resulting from canceling the pseudo echo component.

The encoder 106 sends out (transmits), to the far-end transceiver 20, the output signal transmitted from the echo canceller 105.

The transceiver 10 is configured as described above.

It is to be noted that the transceiver 20 includes: a TV signal receiving unit 120; a decoder 121; an adding unit 122; a speaker 123; a microphone 124; an echo canceller 125; an encoder 126; and a control unit 127, as with the transceiver 10. The function of each of the elements is the same as the function described above, and thus explanation for that will be omitted.

The communication system is configured as described above.

Next, a detailed configuration of each of the adding unit 102 and the control unit 107 will be described with reference to FIG. 2.

Figure 2:
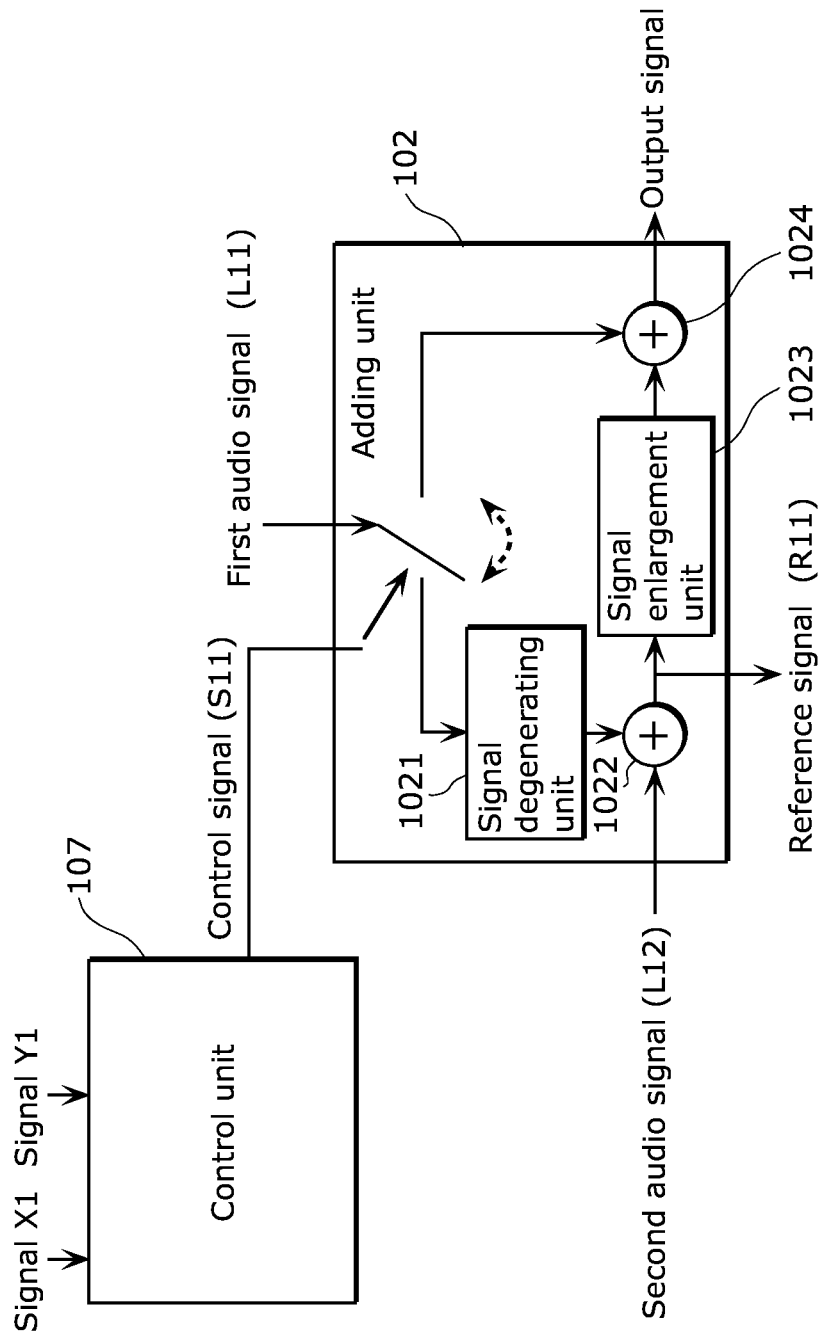
FIG. 2 is a diagram which illustrates a detailed configuration of an adding unit and a control unit according to Embodiment 1 of the present invention.

FIG. 2 is a diagram which illustrates detailed configurations of the adding unit 102 and the control unit 107.

As illustrated in FIG. 2, the adding unit 102 includes: a signal degenerating unit 1021; a first adding unit 1022; a signal enlargement unit 1023; and a second adding unit 1024, receives the first audio signal, the second audio signal, and the control signal, and generates a reference signal R11 to be transmitted to the echo canceller 105 and an output signal to be transmitted to the speaker 103.

In addition, as illustrated in FIG. 2, the control unit 107 receives a signal X1 which indicates whether or not a reception signal is received, and a signal Y1 which indicates whether or not a TV signal is received. The control unit 107 generates, based on the signal X1 and the signal Y1, a control signal S11 for controlling an operation of the adding unit 102. The control signal S11 is used in switching between transmitting the first audio signal L22 to the signal degenerating unit 1021 and transmitting the first audio signal L22 to the second adding unit 1024.

Here, according to this exemplary embodiment, the first audio signal L11 is a broadband many-channel signal (multichannel signal), and for example, a stereo signal of 48 kHz. The second audio signal L12 is a narrowband few-channel signal, and for example, a monaural signal of 16 kHz. In addition, the reference signal is a narrowband few-channel signal, and the output signal is a broadband many-channel signal.

The signal degenerating unit 1021 performs downsampling processing and downmix processing. For example, according to this exemplary embodiment, the signal degenerating unit 1021 converts the stereo signal of 48 kHz which is inputted as the first audio signal L11 into the monaural signal of 16 kHz. This is, of course, merely an example, and thus when the first audio signal L11 and the second audio signal L12 have the same sampling frequency, it is sufficient for the signal degenerating unit 1021 to perform only the downmix processing. In addition, when the first audio signal L11 and the second audio signal L12 have the same number of channels, it is sufficient for the signal degenerating unit 1021 to perform only the downsampling processing.

The signal enlargement unit 1023 performs upsampling processing and upmix processing. For example, according to this exemplary embodiment, the signal enlargement unit 1023 converts the monaural signal of 16 kHz into the stereo signal of 48 kHz. It is to be noted that this is, of course, merely an example, and thus when the first audio signal L11 and the second audio signal L12 have the same sampling frequency, it is sufficient for the signal enlargement unit 1023 to perform only the upmix processing. In addition, when the first audio signal L11 and the second audio signal L12 have the same number of channels, it is sufficient for the signal degenerating unit 1021 to perform only the upsampling processing.

The first adding unit 1022 adds up the output signal transmitted from the signal degenerating unit 1021 and the second audio signal L12, and outputs a resultant signal to the signal enlargement unit 1023. At the same time, the first adding unit 1022 outputs a reference signal R11 to the echo canceller 105.

The second adding unit 1024 adds up the output signal transmitted from the signal enlargement unit 1023 and the first audio signal L11, and outputs a resultant signal to the speaker 103.

The adding unit 102 is configured as described above.

Next, operations of the control unit 107 and the adding unit 102 configured as above will be described.

The control unit 107, when the signal X1 is ON (when a reception signal is received) and the signal Y1 is turned ON (when a TV signal is received), generates a control signal S11 for performing control to turn the switch in the adding unit 102 to the left, and transmits the control signal S11 to the adding unit 102. This causes the adding unit 102 to turn the internal switch to the left. More specifically, the adding unit 102 transmits the first audio signal L11 which is received from the TV signal receiving unit 100 to the signal degenerating unit 1021.

Then, the signal degenerating unit 1021 which has received the first audio signal L11 of the TV signal receiving unit 100 performs the downsampling processing and the downmix processing on the signal (the first audio signal L11) to convert the signal to have a sampling frequency and the number of channels which are the same as those of the reception signal (second audio signal L12) received from the far-end transceiver 20, and output the resultant signal to the adding unit 1022. In the first adding unit 1022, the reception signal received from the far-end transceiver 20 and the first audio signal L11 converted by the signal degenerating unit 1021 are added up, and the resultant signal is outputted to the echo canceller 105 as a reference signal R11 and to the signal enlargement unit 1023.

It is to be noted that, since it is possible to make the reference signal R11 to be a narrowband few-channel signal by converting the first audio signal L11 to have the same sampling frequency and the number of channels as those of the reception signal (the second audio signal L12) received from the far-end transceiver 20, through the downsampling processing and the downmix processing, and thus there is an advantage that the amount of computation performed by the echo canceller 105 can be decreased.

On the other hand, the control unit 107, when the signal X1 is OFF (when a reception signal is not received) and the signal Y1 is turned ON (when a TV signal is received), generates a control signal S11 for performing control to turn the switch in the adding unit 102 to the right, and transmits the control signal 511 to the adding unit 102. This causes the adding unit 102 to turn the internal switch to the right. More specifically, the adding unit 102 transmits the first audio signal L11 which is received from the TV signal receiving unit 100 to the second adding unit 1024. In this case, since the transceiver 10 is not received a reception signal from the far-end transceiver 20, the second adding unit 1024 does not actually perform adding processing, and thus outputs, to the speaker 103, the first TV signal which is provided to the second adding unit 1024 as it is.

As described above, the control unit 107 controls the adding unit 102, thereby making it possible to transmit an audio signal (the first audio signal L11) which is transmitted from the TV signal receiving unit 100 and represents audio of the original broadband many-channels to be received by a talker of the near-end transceiver 10. On the other hand, since it is possible to add the TV signal (the first audio signal L11) to the reference signal R11 provided to the echo canceller 105 when the talker of the near-end transceiver 10 is talking with the talker of the far-end transceiver 20, it is possible to prevent the TV audio that is received by the near-end transceiver 10 (the first audio signal L11 of the TV signal receiving unit 100) from being sent out to the far-end transceiver 20.

With this, even when the same TV signal are received by the far-end side and the near-end side, the audio signal of the TV on the near-end side is not sent out to the far-end side, and thus it is possible to receive the TV well on the far-end side.

In other words, even when the same TV signal is received by the far-end side and the near-end side, it is possible to suppress the state where as if an intense echo of the audio signal of TV returns on the far-end side.

As described above, it is possible to avoid performing unnecessary echo estimation when broadcast waves are not received and to implement a transceiver which is capable of reducing power consumption.

More specifically, when the TV signal receiving unit 100 receives a broadcast wave (TV signal) and the decoder 101 decodes a reception signal received from a different transceiver, converts the sampling frequency of the first audio signal L11 so as to be a signal having the sampling frequency of the second audio signal, and then adds the signal to a signal having the sampling frequency of the second audio signal L12, thereby adding up the first audio signal L11 and the second audio signal L12 and transmitting the resultant signal to the speaker 103. At the same time, the adding unit 102 outputs, to the echo canceller 105, the signal obtained by adding up the second audio signal L12 and the signal resulting from converting the first audio signal L11 so as to have the sampling frequency of the second audio signal L12, as a reference signal R11. On the other hand, when the TV signal receiving unit 100 receives a broadcast wave (TV signal) and when the decoder 101 does not decode a reception signal received from a different transceiver, turns a switch in the adding unit 102 to the right to directly transmit the first audio signal L11 to the speaker 103 and transmit nothing to the echo canceller 105. In this case, the adder positioned to the right in the adding unit 102 is, of course, unnecessary.

Modification 1

Although the control unit 107 generates the control signal Sit according to whether or not a TV signal is received from the TV signal receiving unit 100 and whether or not a reception signal is received from the far-end transceiver 20 according to Embodiment 1, the invention is not limited to this case. The control unit may generate the control signal S11 according to an instruction from a user, without receiving an input signal. This case will be explained as Modification 1.

Figure 3:
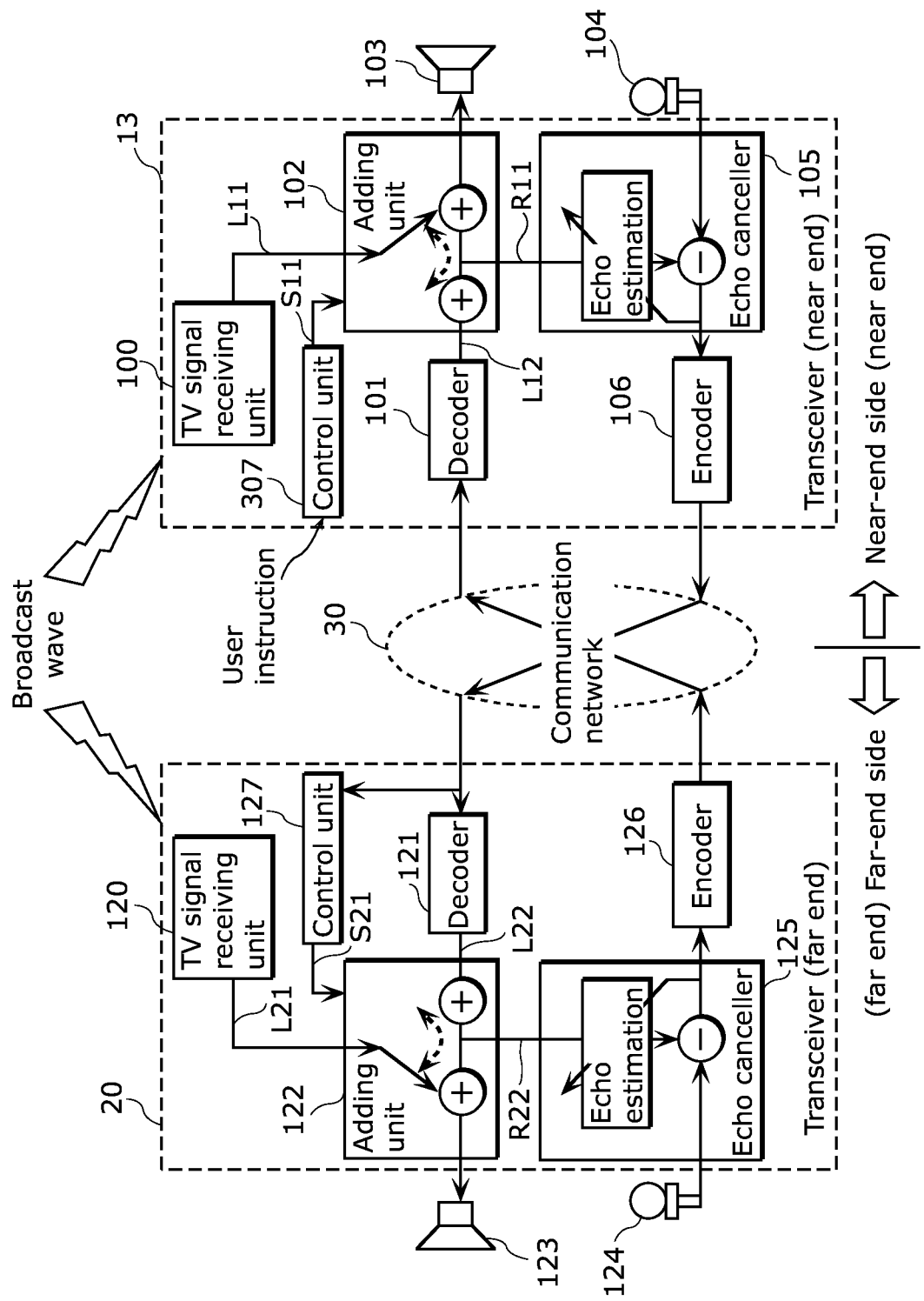
FIG. 3 is a diagram which illustrates a configuration of the communication system according to Modification 1 of Embodiment 1 of the present invention.

FIG. 3 is a diagram which illustrates a configuration of the communication system according to Modification 1 of Embodiment 1 of the present invention. Elements identical to elements in FIG. 1 are provided with the same reference signs, and detailed explanation for them will be omitted.

A transceiver 13 illustrated in FIG. 3 is different from the transceiver 10 according to Embodiment 1 in the configuration of a control unit 307. More specifically, the control unit 107 and the control unit 307 are different in that the control unit 107 receives an input of a reception signal (signal Y1) transmitted from the far-end transceiver 20 and an input of a TV signal (signal X1) received from the TV signal receiving unit 100, whereas the control unit 307 receives an input of an instruction from a user.

For example, a user (a talker of the near-end transceiver 13), when it is found out that the TV program being viewed on the near-end side is also being viewed on the far-end side during talk with the far-end transceiver 20, provides the control unit 307 with a user instruction which indicates that a TV signal of the near-end side is to be added to the reference signal R11. In response to this user instruction, the control unit 307 transmits, to the adding unit 102, a control signal S11 for performing control to cause the switch in the adding unit 102 illustrated in FIG. 2 to be turned to the left.

With this, since the TV signal of the near-end side can be canceled by the echo canceller 105 on the near-end side, it is possible to avoid the state where the TV audio on the near-end side is sent out to the far-end side, and as if an intense echo returns to the far-end side which receives the sent out TV audio.

In addition, for example, when the far-end side is viewing a TV program which is a different program from a program viewed by the near-end side during talk with the far-end transceiver 20, since the TV audio on the near-end side is simply transmitted to the far-end side and this is not a signal to be particularly canceled, the user (the talker of the near-end transceiver 13) provides the control unit 307 with a user instruction indicating that the TV signal on the near-end side is not to be added to the reference signal R11. In response to this user instruction, the control unit 307 transmits, to the adding unit 102, a control signal S11 for performing control to cause the switch in the adding unit 102 illustrated in FIG. 2 to be turned to the right.

With this, it is possible to allow a user to receive a TV signal as an original broadband many-channel signal on the near-end side. It is to be noted that, in this case, the signal enlargement unit 1023 enlarges the reception signal (the second audio signal L12) to have a sampling frequency of the TV signal (the first audio signal L11), and then the second adder 1024 adds the resultant signal to the TV signal (the first audio signal L11). Here, the signal enlargement unit 1023 may enlarge the reception signal (the second audio signal L12) to have a sampling frequency of the TV signal (the first audio signal L11), and then further enlarge the number of channels to the number of channels of the TV signal.

As described above, according to this modification example, it is also possible to prevent audio of TV from being transmitted to the far end, and an advantageous effect that audio can be received with the high audio quality of original TV audio when the audio of TV may be transmitted to the far end or when the near-end talker is not talking with the far-end talker.

Modification 2

Although a user determines whether or not to add a near-end TV signal to the reference signal R11 and provides the control unit 307 with a user instruction, the invention is not limited to this case. The determination and control may be performed automatically. An example for this case will be explained as Modification 2.

Figure 4:
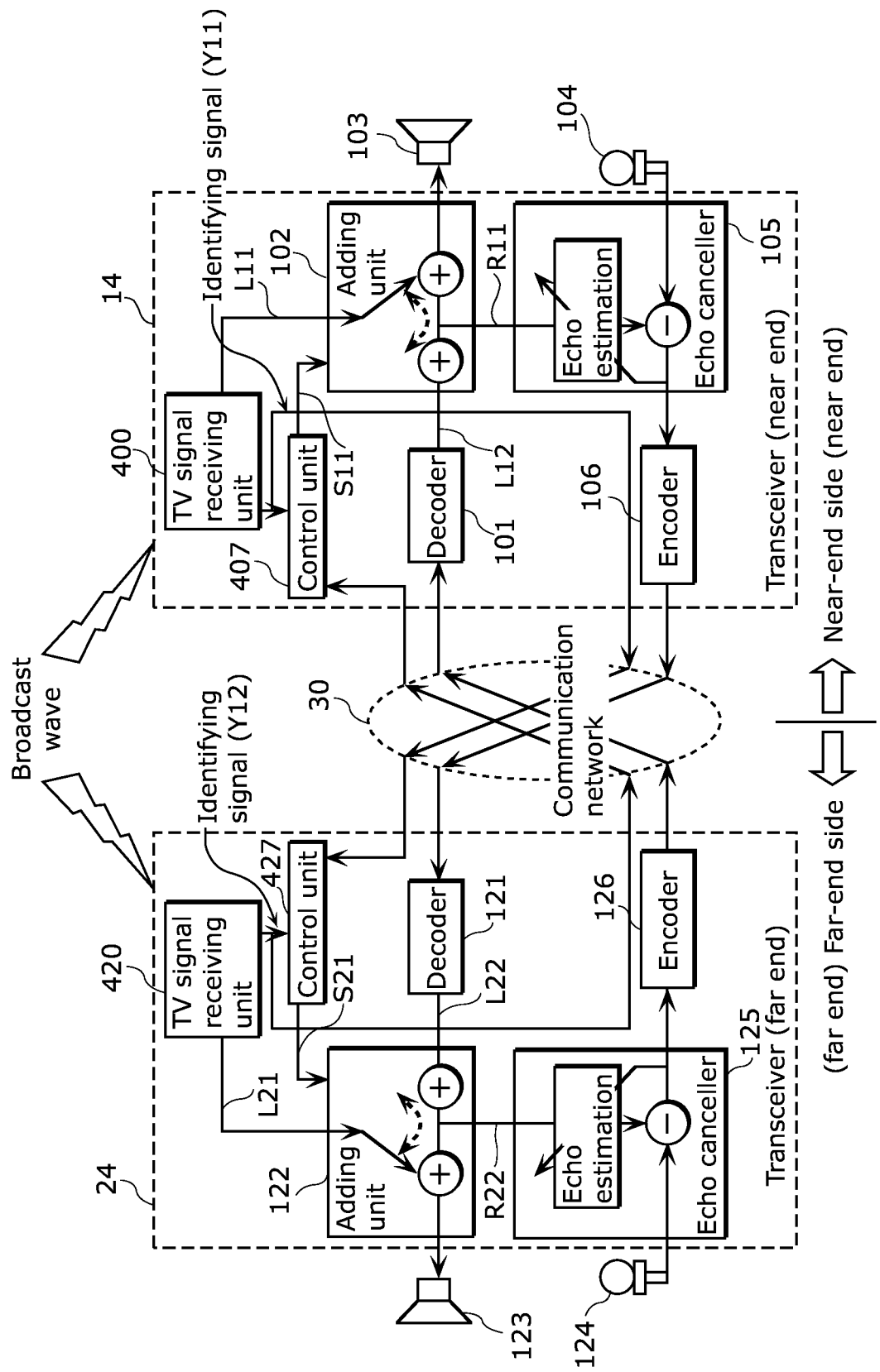
FIG. 4 is a diagram which illustrates a configuration of the communication system according to Modification 2 of Embodiment 1 of the present invention.

FIG. 4 is a diagram which illustrates a configuration of the communication system according to Modification 2 of Embodiment 1 of the present invention. Elements identical to elements in FIG. 1 and FIG. 3 are provided with the same reference signs, and detailed explanation for them will be omitted.

A transceiver 13 illustrated in FIG. 4 is different from the transceiver 10 according to Embodiment 1 in the configurations of a TV signal receiving unit 400 and a control unit 407. More specifically, whereas the TV signal receiving unit 100 outputs, to the control unit 307, a TV signal (signal X) received by the near-end transceiver 14, the TV signal receiving unit 400 is different in that the TV signal receiving unit 400 outputs, to the control unit 407, an identifying signal (Y11) of TV broadcast received by the near-end transceiver 14, and outputs to the far-end transceiver 24 via the communication network 30.

In addition, the configuration differs in that, whereas the control unit 107 receives an input of a reception signal (signal Y1) transmitted from the far-end transceiver 20 and an input of a TV signal (signal X1) from the TV signal receiving unit 100, the control unit 407 receives an input of an identifying signal of TV broadcast (Y11) received by the near-end transceiver 14 and an input of an identifying signal of TV broadcast (Y12) received by the far-end transceiver 24.

Likewise, a transceiver 24 illustrated in FIG. 4 is different from the transceiver 20 according to Embodiment 1 in the configurations of a TV signal receiving unit 420 and a control unit 427. More specifically, whereas the TV signal receiving unit 120 outputs, to the control unit 127, a TV signal (signal Y2) received by the far-end transceiver 20 the TV signal receiving unit 400 is different in that the TV signal receiving unit 420 outputs, to the control unit 427, an identifying signal (Y12) of TV broadcast received by the near-end transceiver 14, and outputs to the near-end transceiver 14 via the communication network 30. In addition, the configuration differs in that, whereas the control unit 127 receives an input of a reception signal (signal Y2) transmitted from the far-end transceiver 120 and an input of a TV signal (signal X2) from the TV signal receiving unit 120, the control unit 427 receives an input of an identifying signal of TV broadcast (Y11) received by the near-end transceiver 14 and an input of an identifying signal of TV broadcast (Y12) received by the TV signal receiving unit 420.

In sum, an identifying signal (Y11) of TV broadcast received by the near-end transceiver 14 is sent out to the far-end transceiver 24, and an identifying signal (Y12) of TV broadcast received by the far-end transceiver 14 is sent out to the near-end transceiver 14, and the identifying signals are compared. With this, for example, it is possible to determine whether or not a TV program same as a TV program of the far end transceiver 24 is received by the transceiver 14.

Here, the identifying signal may be a symbol provided to each program of TV broadcast, or may be a symbol for identifying a broadcast station.

Figure 5:
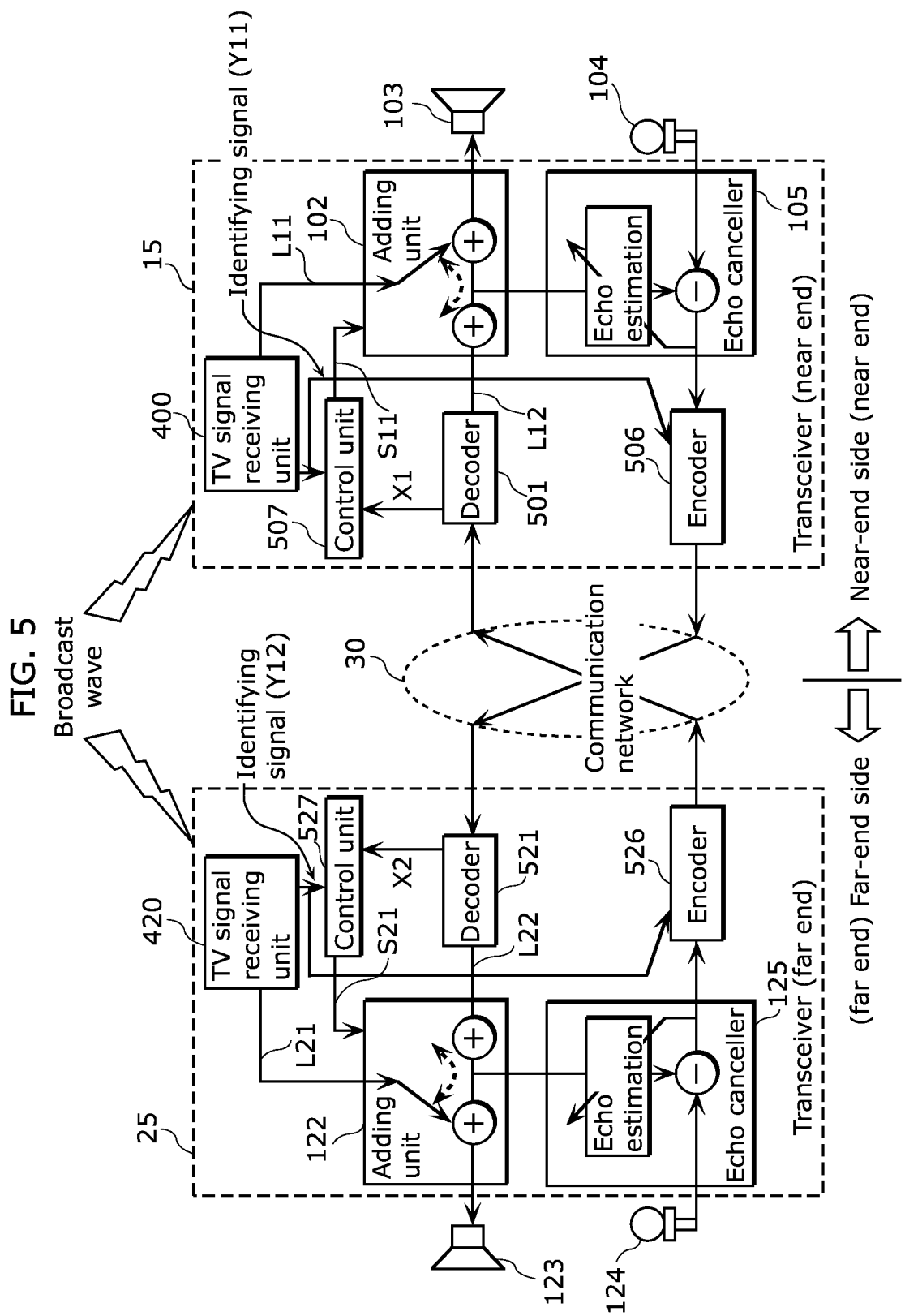
FIG. 5 is a diagram which illustrates another configuration of the communication system according to Modification 2 of Embodiment 1 of the present invention.

It is to be noted that the TV signal receiving unit 420 outputs the identifying signal of the TV broadcast received by the far-end transceiver 24, to the near-end transceiver 14 via the communication network 30, according to the above description, however, the invention is not limited to this case. As illustrated in FIG. 5, the TV signal receiving unit 400 may output the identifying signal to an encoder 506, and the identifying signal may be coded by the encoder 506 and sent out to the far-end transceiver 25 as side information of the communication signal. In this case, in the far-end transceiver 25, the identifying signal may be separated after being decoded by the decoder 521, and sent out to the control unit 527. Here, FIG. 5 is a diagram which illustrates a configuration of the communication system according to Modification 2 of Embodiment 1 of the present invention.

As described above, according to this modification example, it is possible to automatically determine whether or not the near end and the far end receive the same broadcast waves. With this, not only it is also possible to prevent audio of TV from being transmitted to the far-end side when the near end and the far end receive the same broadcast waves, but also an advantageous effect that audio can be received with the high audio quality of original TV audio when the near end and the far end do not receive the same broadcast waves.

Figure 6:
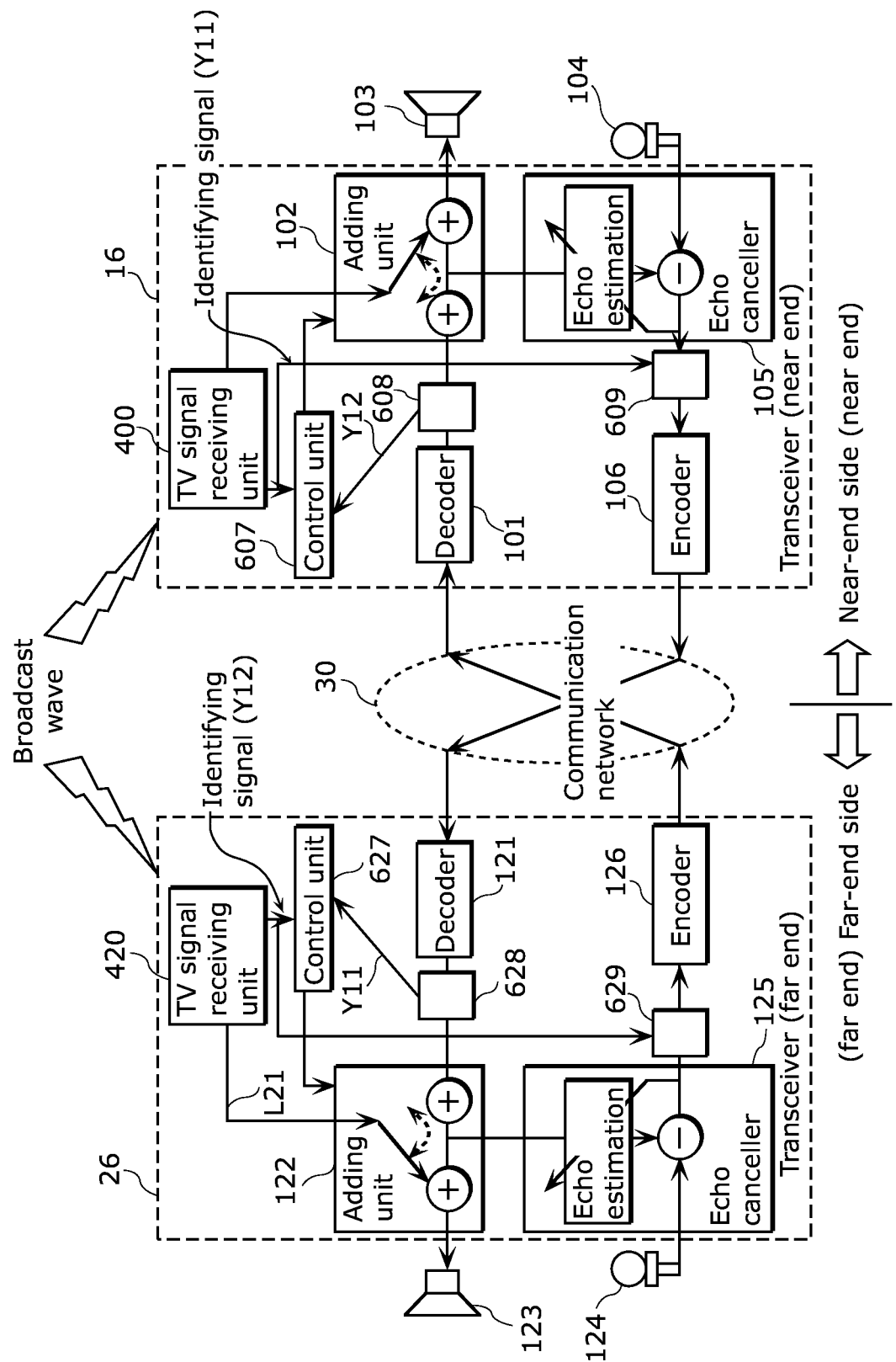
FIG. 6 is a diagram which illustrates yet another configuration of the communication system according to Modification 2 of Embodiment 1 of the present invention.

It is to be noted that, although the identifying signal is coded by the encoder 506 and sent out to the far-end transceiver 24 as the side information of the communication signal in FIG. 5, the invention is not limited to this case. For example, as illustrated in FIG. 6, the TV signal receiving unit 400 may output the identifying signal not to the encoder 506 but to an audio watermark encoder 609, and the audio watermark encoder 609 may adds the identifying signal to the communication signal itself, using an audio watermark technique.

In this case, the encoder 106 codes the communication signal added to the identifying signal, and transmits to the far-end transceiver 26. Then, the far-end transceiver 26 may transmit the signal decoded by the decoder 121 to the audio watermark decoder 627. In addition, the audio watermark decoder 628 may separate the identifying signal from the communication signal of the transceiver 16, and output the identifying signal to the control unit 627 and the communication signal of the transceiver 16 to the adding unit 122.

Embodiment 2

Although the speaker 103 outputs a sound of a signal resulting from adding up the first audio signal L11 and the second audio signal L12 when TV reception and communication are carried out at the same time, however the invention is not limited to this case. For example, when TV reception and communication are carried out at the same time, the speaker 103 may output a sound by placing priority on the sound of communication. The following describes the case as Embodiment 2.

Figure 7:
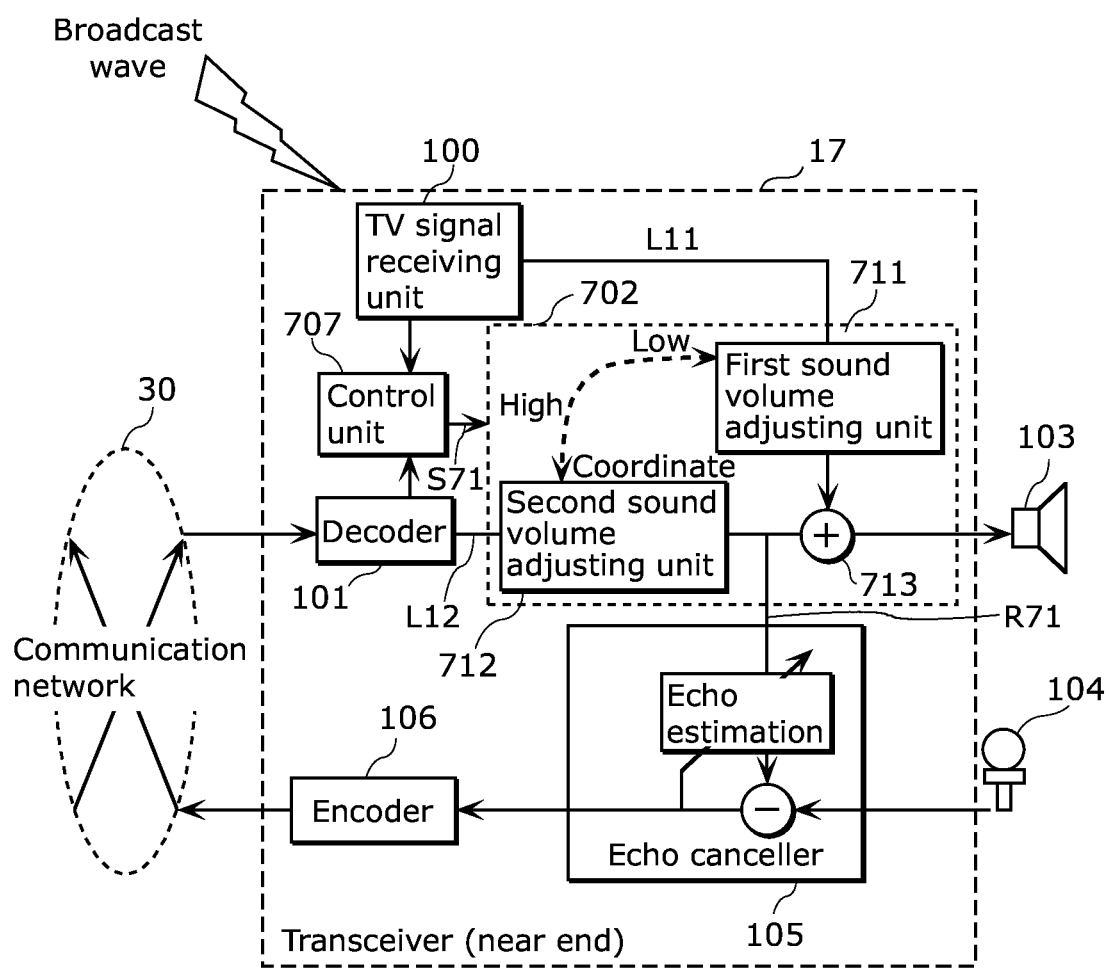
FIG. 7 is a diagram illustrating a configuration of a transceiver at the near end according to Embodiment 2 of the present invention.

FIG. 7 is a diagram illustrating a configuration of a transceiver 17 in the near end according to Embodiment 2 of the present invention. Elements identical to elements in FIG. 1A are provided with the same reference signs, and detailed explanation for them will be omitted.

The transceiver 17 illustrated in FIG. 7 is different from the transceiver 10 according to Embodiment 1 in the configurations of an adding unit 707 and a control unit 702.

Specifically, the adding unit 702 includes: a first sound volume adjusting unit 711; a second sound volume adjusting unit 712; and an adder 713, and outputs, to the speaker 103, a reception signal transmitted from the far-end transceiver 20 with priority thereon. More specifically, the adding unit 702, which is an example of an adding unit according to the present invention, includes: the first sound volume adjusting unit 711 which adjusts a sound volume of the first audio signal L11; and the second sound volume adjusting unit 712 which adjusts a sound volume of the second audio signal L12, adds up the first audio signal L11 and the second audio signal L12 to transmit a resultant signal to the speaker 103, and outputs a reference signal R71. When the TV signal receiving unit 100 receives a broadcast wave (TV signal) and the second audio signal L12 is outputted to the echo canceller 105 as the reference signal R71, the adding unit 702 renders the output level of the first sound volume adjusting unit 711 to be smaller than the output level of the second sound volume adjusting unit 712, and adds up, and transmit to the speaker 103, the second audio signal L12 and the first audio signal with a smaller output level than the output level of the second audio signal L12. To be more specific, the first sound volume adjusting unit 711 adjusts the sound volume of the first audio signal L11 which is a TV signal, using the control signal S71.

The second sound volume adjusting unit 712 adjusts the sound volume of the second audio signal L12 which is a reception signal, using the control signal S71.

The control unit 707 generates, and outputs to the adding unit 702, the control signal S71 for controlling the adding unit 702, based on the reception signal (signal X1) received from the TV signal receiving unit 100 and the reception signal (signal Y1) received from the decoder 101.

For example, when TV reception and communication are carried out at the same time, the control unit 707 generates, and outputs to the adding unit 702, the control signal S71 which renders output level of the second sound volume adjusting unit to be larger than the output level of the first volume adjusting unit in order to place priority on the sound of communication. In particular, when the output level of the second sound volume adjusting unit 712 is not 0, the control unit 707 may generate, and output to the adding unit 702, the control signal S71 which renders the output level of the first sound volume adjusting unit 711 to be 0.

Figure 16:
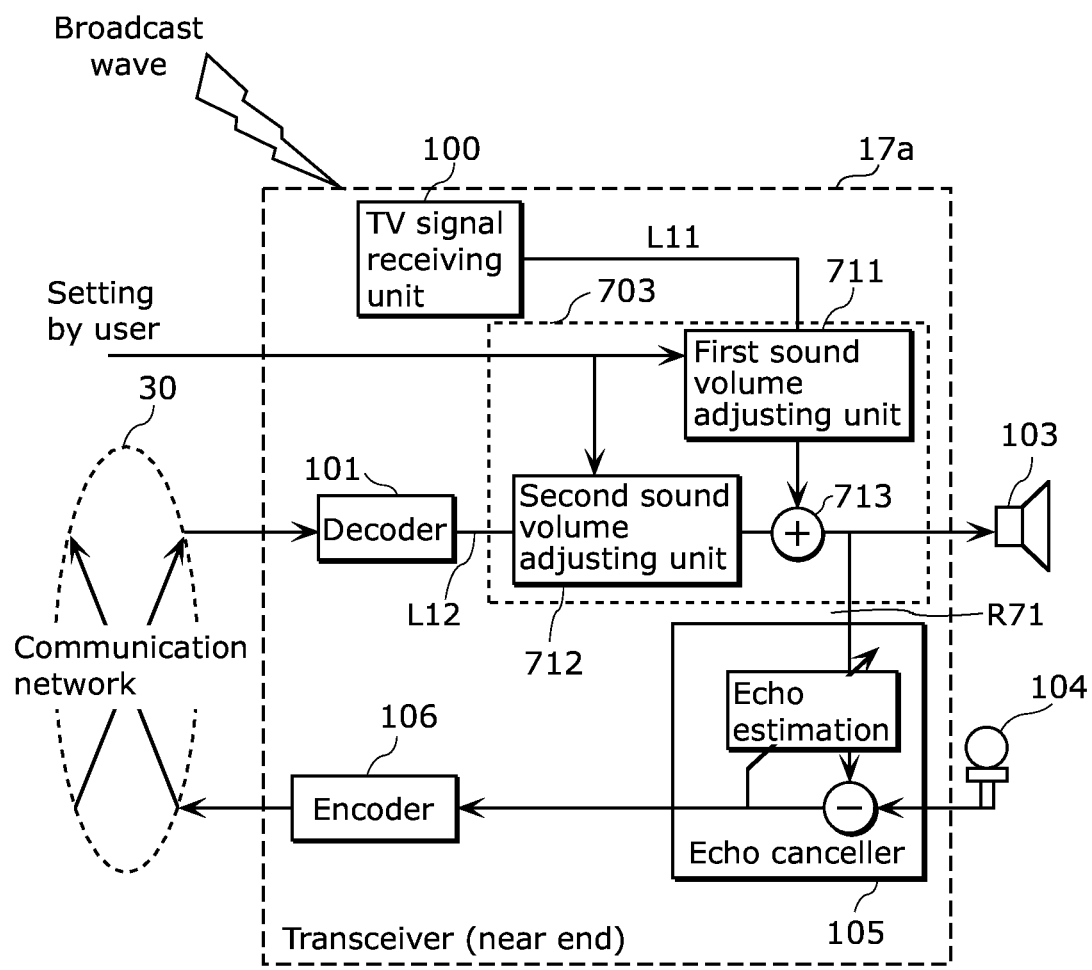
FIG. 16 is a diagram illustrating another configuration of a transceiver at the near end according to Embodiment 2 of the present invention.

It is to be noted that, although the reference signal R71 is an input signal to the adding unit 713 according to Embodiment 2, the reference signal R71, of course, may be an output signal to the adding unit 713. In addition, it has been described that control on the first sound volume adjusting unit 711 and the second sound volume adjusting unit 712 is executed using the control signal S71, however the control, of course, may be executed according to an instruction from a user. In sum, the configuration of the transceiver 17 illustrated in FIG. 7 may be as configuration of the transceiver 17a illustrated in FIG. 16. The adding unit 703 illustrated in FIG. 16 is the same as the adding unit 102 illustrated in FIG. 7 other than that the reference signal R71 is an output signal of the adder 713 and the levels of sound volume adjustment to be set to the first sound volume adjusting unit 711 and the second sound volume adjusting unit 712 are based on a user instruction.

Embodiment 3

In Embodiment 1 and Embodiment 2, the case has been described where the transceiver is capable of performing the broadcast wave receiving function and the communication function, that is, the case where the TV receiver and communication unit are integrated. In Embodiment 3, the case will be described where the TV receiver and the communication unit are different casings.

It is to be noted that, the description below assumes the case where TV receivers which are different casings are placed respectively on the near-end side and the far-end side, and the both sides receive the same TV program during communication.

The following explains, with reference to the diagrams, a transceiver according to Embodiment 3 of the present invention.

Figure 8:
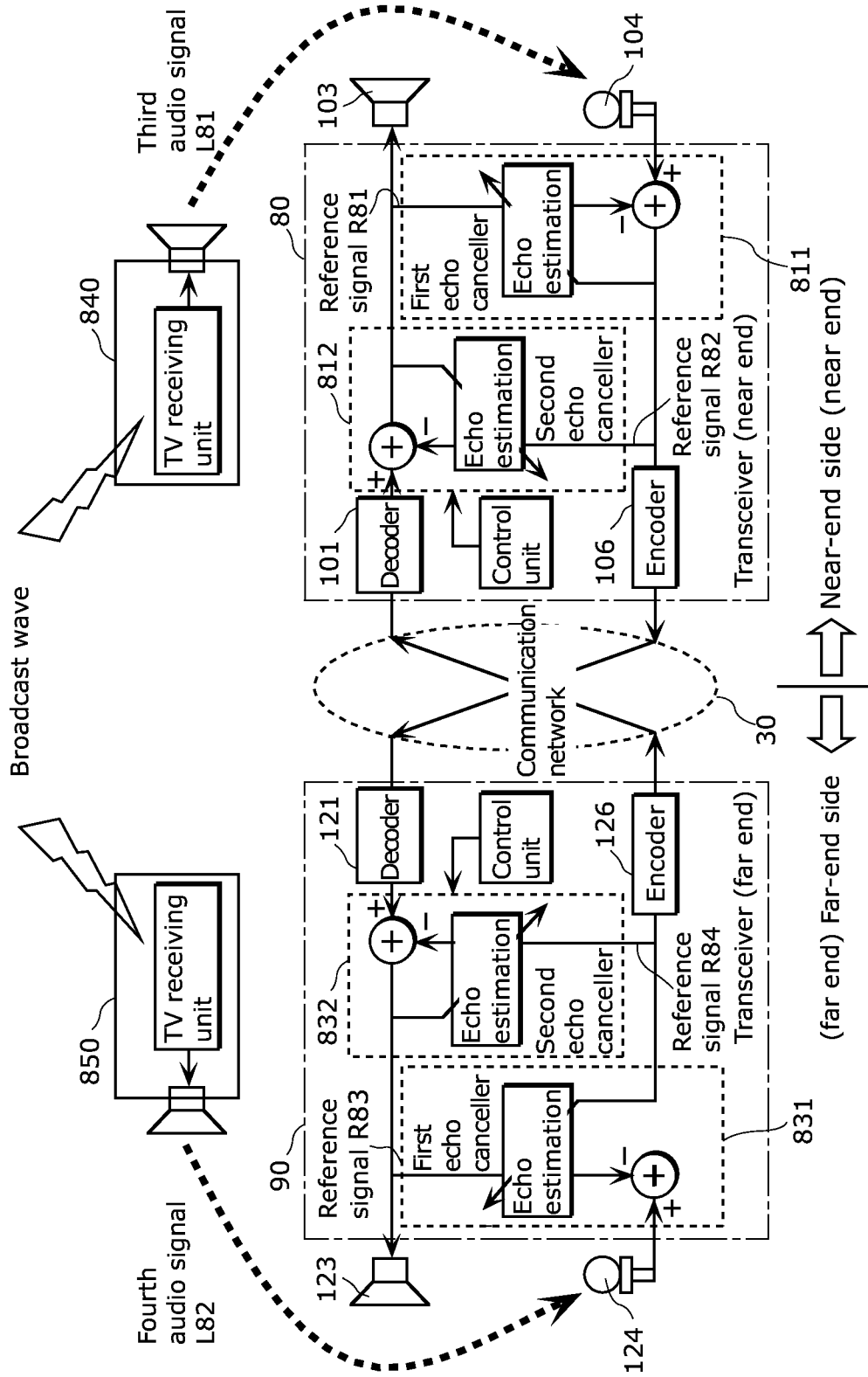
FIG. 8 is a diagram illustrating a configuration of a communication system according to Embodiment 3 of the present invention.
Figure 9:
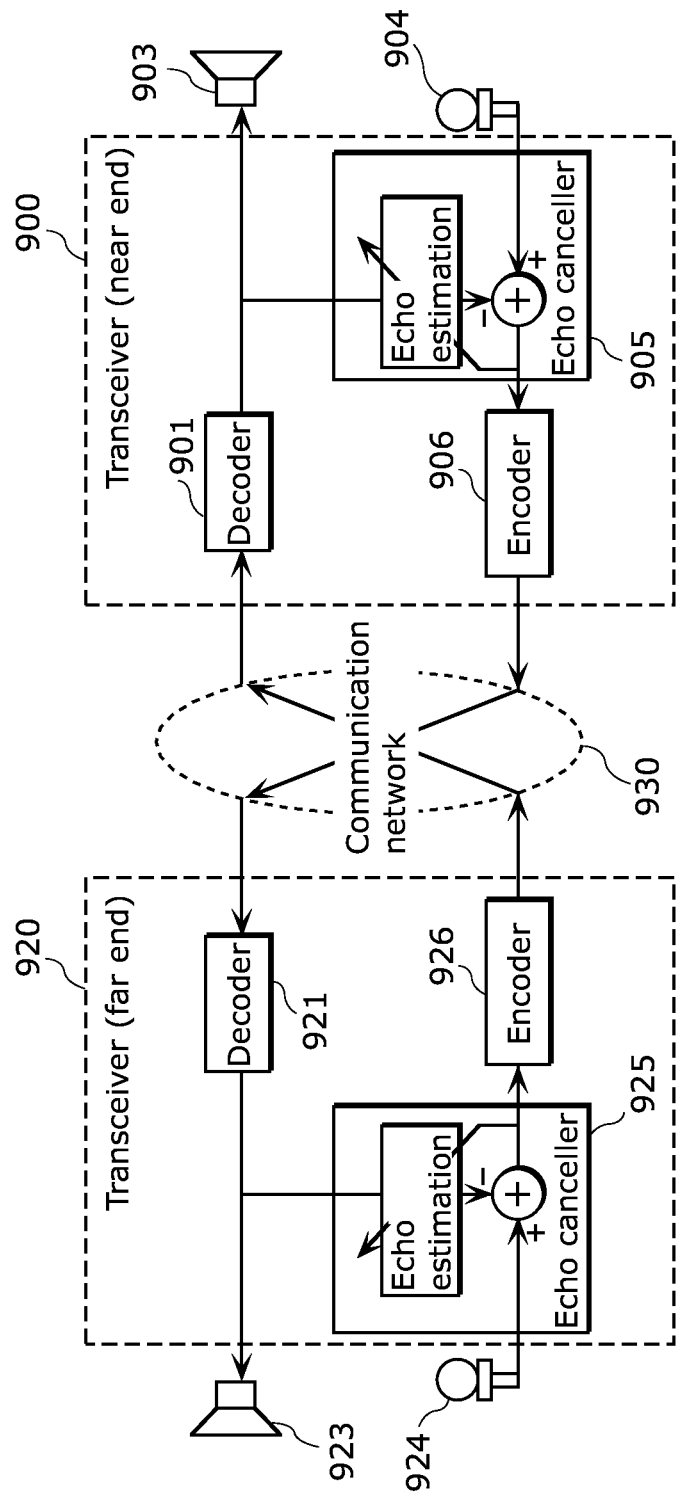
FIG. 9 is a diagram which illustrates a configuration of a communication system using a conventional transceiver.
Figure 10:
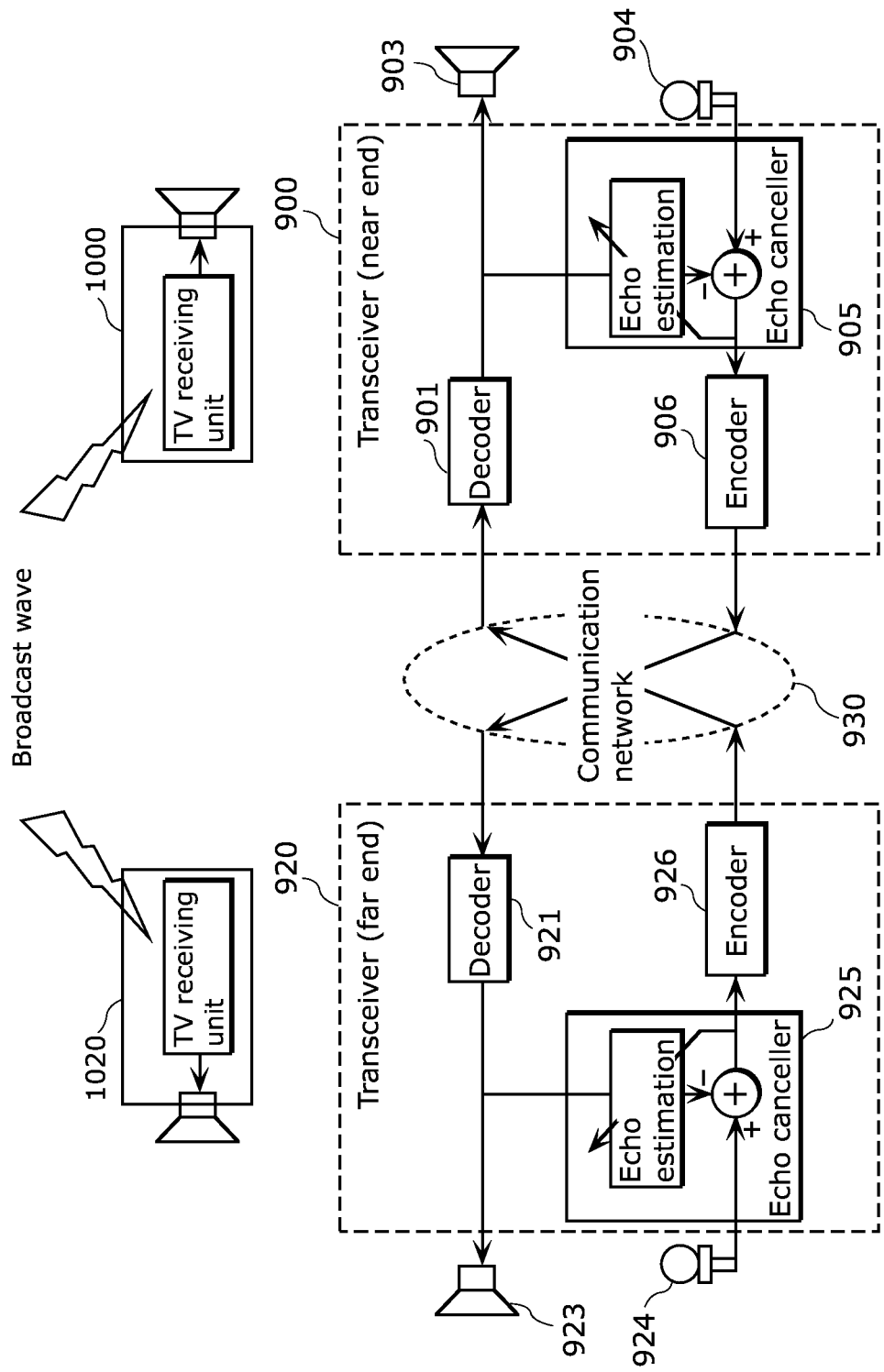
FIG. 10 is a diagram for explaining a problem in a communication system in which a conventional transceiver is used.

FIG. 8 is a diagram illustrating a configuration of a communication system according to Embodiment 3 of the present invention.

The communication system illustrated in FIG. 8 includes: a transceiver 80 which is located at the near end and is used by a talker of a communication dispatch point; a transceiver 90 which is located at the far end and is used by a talker of a communication destination; and a communication network 30 used for receiving and transmitting a sound of the transceiver 80 and the transceiver 90. It is to be noted that elements identical to elements in FIG. 1 are provided with the same reference signs, and detailed explanation will be omitted.

The transceiver 80 includes at least: a speaker 103; and a microphone 104 which, when the TV receiver 840 which receives a broadcast wave (TV signal) outputs a third audio signal L81, at least picks up the third audio signal L81. More specifically, the transceiver 80 includes: a decoder 101; the speaker 103; the microphone 104; a first echo canceller 811; a second echo canceller 812; and an encoder 106. Likewise, the transceiver 90 includes: a decoder 121; the speaker 123; the microphone 124; a first echo canceller 831; a second echo canceller 832; and an encoder 126.

Here, the TV receiver 840 is a different casing from the transceiver 80, is placed on the near-end side, receives a TV signal from a broadcast wave, and generates the third audio signal L81. Likewise, the TV receiver 850 is a different casing from the transceiver 90, is placed on the far-end side, receives a TV signal from a broadcast wave, and generates the fourth audio signal L82.

The microphone 104 picks up, and outputs to the first echo canceller 811, the third audio signal L81 generated by the TV receiver 840.

The first echo canceller 811 is an example of the first echo canceller according to the present invention, estimates a first pseudo echo component from the reference signal R81, and cancels the first pseudo echo component in the picked-up signal which is picked up, by the microphone 104, a sound outputted from at least the speaker 103. More specifically, when the transceiver 90 picks up an audio signal outputted from the TV receiver 850 which receives a broadcast wave, the first echo canceller 811 cancels the first pseudo echo component in the picked-up signal obtained by picking up, by the microphone 104, a sound outputted from the speaker 103 and the third audio signal L81 outputted from the TV receiver 840. Here, the reference signal R81 is the fourth audio signal L82 obtained by canceling the second pseudo echo component by the second echo canceller 812. When the transceiver 90 picks up an audio signal outputted from the TV receiver 850 which receives a broadcast wave same as the broadcast wave, the fourth audio signal L82 is substantially identical to the third audio signal L81.

More specifically, the first echo canceller 811 cancels an echo resulting from picking up, by the microphone 104, an audio signal emitted from the speaker 103. The first echo canceller 811 sends out an output signal resulting from canceling an echo, to the far-end transceiver 90 via the communication network 30 and the encoder 106, and to the second echo canceller 812 as a reference signal R82 of the second echo canceller 812.

Here, the first echo canceller 811 cannot cancel the third audio signal L81. This is because, as illustrated in FIG. 8, the reference signal R81 of the first echo canceller 811 is configured so as to be a signal to be outputted from the speaker 103.

The second echo canceller 812 cancels an echo included in the audio signal outputted from the decoder 101. More specifically, the second echo canceller 812 cancels the fourth audio signal L82 included in the audio signal outputted from the decoder 101 as a pseudo echo estimated based on the reference signal R82.

Here, the reference signal R82 of the second echo canceller 812 is the third audio signal L81, and the third audio signal L81 and the fourth audio signal L82 are originally the audio of the same TV program, and thus an echo of the third audio signal L81 is as if it were the fourth audio signal L82. For that reason, the second echo canceller 812 is capable of canceling the fourth audio signal L82 included in the audio signal outputted from the decoder 101 as a pseudo echo estimated based on the reference signal R82.

The second echo canceller 812, which is an example of the second echo canceller according to the present invention, estimates a second pseudo echo component with a picked-up signal obtained by canceling the first pseudo echo component by the first echo canceller 811 as being the reference signal R82, and cancels the second pseudo echo component in the fourth audio signal L82. Specifically, the second echo canceller 812 cancels the second pseudo echo component including the fourth audio signal L82 transmitted from the transceiver 90, from the audio signal outputted from the decoder 101. More specifically, the second echo canceller 812 cancels, and outputs to the speaker 103, a TV audio from the audio signal outputted from the decoder 101. Thus, the speaker 103 outputs a sound of the far-end talker in the state where the TV audio is cancelled.

The same holds true for the far-end side.

More specifically, the microphone 124 picks up, and outputs to the first echo canceller 831, the fourth audio signal L82 generated by the TV receiver 850.

The first echo canceller 831 cancels an echo resulting from picking up, by the microphone 124, an audio signal emitted from the speaker 123. The first echo canceller 831 sends out the output signal in which an echo is canceled, to the near-end transceiver 80 via the communication network 30, as well as transmitting to the second echo canceller 832 as the reference signal R84 of the second echo canceller 832.

Here, the first echo canceller 831 cannot cancel the fourth audio signal L82. This is because, as illustrated in FIG. 8, the reference signal R83 of the first echo canceller 831 is configured so as to be a signal to be outputted from the speaker 123.

The second echo canceller 832 cancels an echo included in the audio signal outputted from the decoder 121. More specifically, the second echo canceller 832 cancels the third audio signal L81 included in the audio signal outputted from the decoder 121 as a pseudo echo estimated based on the reference signal R84.

Here, the reference signal R84 of the second echo canceller 832 is the fourth audio signal L82, and the third audio signal L81 and the fourth audio signal L82 are originally the audio of the same TV program, and thus an echo of the fourth audio signal L82 is as if it were the third audio signal L81 For that reason, the second echo canceller 832 is capable of canceling the third audio signal L81 included in the audio signal outputted from the decoder 121 as a pseudo echo estimated based on the reference signal R84.

The second echo canceller 832 cancels, and outputs to the speaker 123, a TV audio from the audio signal outputted from the decoder 121. Thus, the speaker 123 outputs a sound of the far-end talker in the state where the TV audio is cancelled.

The communication system is configured as described above.

As described above, according to the present embodiment, even when a TV audio signal is not added to the reference signal, for example, the case where the TV receiving function and the communication function are configured as being different devices (different casings), it is possible to cancel, in the near end, a sound of TV from the far end and to leave the communication unaffected when the same TV program is received by the far end and the near end.

It is to be noted that, even when the TV receiving function and the communication function are configured as being different devices (different casings), the second echo canceller 812 may be prevented from operating when the same TV program is not received by the far end and the near end. In this case, when a control unit is included and it is determined that the same broadcast wave (TV program) is not received by the far end and the near end, an operation of the second echo canceller 812 is suspended. It is therefore possible to avoid performing unnecessary echo estimation when the same broadcast wave is not received by the far end and the near end and to reduce power consumption.

Embodiment 4

Although, in Embodiment 1, when TV reception and communication are carried out at the same time, the first audio signal L11 is degenerated by the signal degenerating unit 1021, then the degenerated first audio signal L11 and the second audio signal L12 are added up by the first adder 1022, and a signal resulting from the adding up is transmitted to the speaker after the signal is enlarged by the signal enlargement unit 1023, the invention is not limited to this.

In this exemplary embodiment, a detailed configuration different from the adding unit 102 will be described with reference to FIG. 11.

Figure 11:
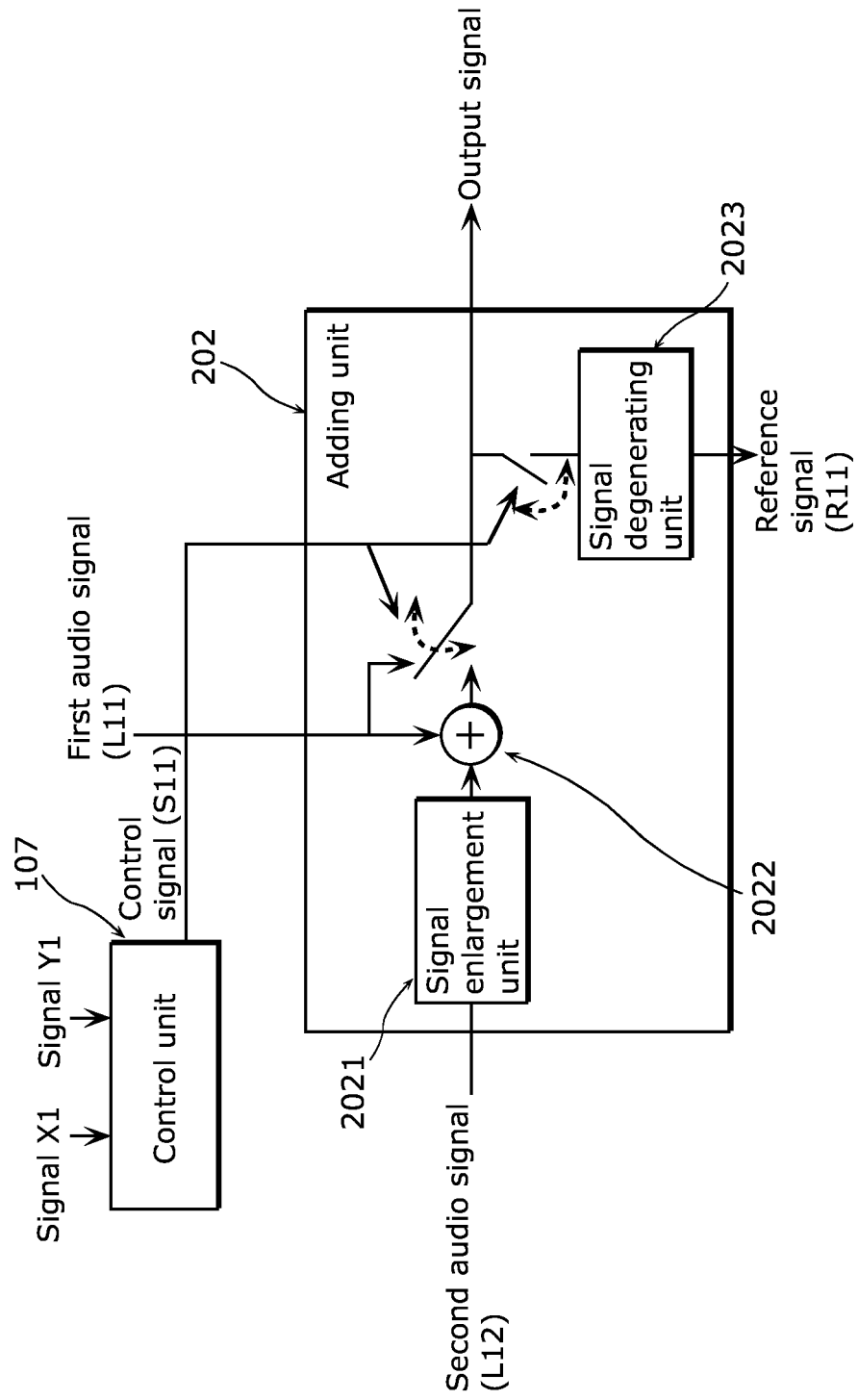
FIG. 11 is a diagram which illustrates a detailed configuration of an adding unit and a control unit according to Embodiment 4 of the present invention.

FIG. 11 is a diagram which illustrates detailed configurations of the adding unit 202 and the control unit 107 according to Embodiment 4 of the present invention. It is to be noted that elements identical to elements in FIG. 1 and FIG. 2 are provided with the same reference signs, and detailed explanation for them will be omitted.

As shown in FIG. 11, the adding unit 202 includes: a signal enlargement unit 2012; an adder 2022; and a signal degenerating unit 2023, receives the first audio signal, the second audio signal, and the control signal, and generates the reference signal R11 to be transmitted to the echo canceller 105 and the output signal to be transmitted to the speaker 103.

In addition, as illustrated in FIG. 11, the control unit 107 receives a signal X1 which indicates whether or not a reception signal is received, and a signal Y1 which indicates whether or not a TV signal is received. The control unit 107 generates, based on the signal X1 and the signal Y1, a control signal S11 for controlling an operation of the adding unit 202. The control signal S11 is used in switching between transmitting an output signal of the adder 2022 to the speaker 103 and transmitting the first audio signal L11 to the speaker 103, and between outputting and not outputting the reference signal R11. The adding unit 202 is configured as described above.

Next, operations of the control unit 107 and the adding unit 202 configured as above will be described.

The control unit 107, when the signal X1 is ON (when a reception signal is received) and the signal Y1 is turned ON (when a TV signal is received), generates a control signal 511 for performing control to turn the two switches in the adding unit 202 to the lower side, and transmits the control signal 511 to the adding unit 202. This causes the adding unit 202 to turn the internal switches to the lower side. In this case, the adding unit 202 transmits, to the speaker 103, a signal resulting from enlarging, by the signal enlargement unit 2021, the second audio signal L12 received from the decoder 101, and adding, by the adder 2022, the enlarged signal and the first audio signal L11 received from the TV signal receiving unit 100. The adding unit 202 also transmits, to the signal degenerating unit 2023, a signal to be transmitted to the speaker 103.

The signal enlargement unit 2021, which has received the second audio signal L12 from the decoder 101, performs upsampling processing and channel enlargement processing on the signal (the second audio signal L12) to be converted into the same sampling frequency and the number of channels as those of the TV signal (first audio signal L12) and transmitted to the adder 2022. The adder 2022 adds up the signal obtained by enlarging, as describe above, the reception signal (the second audio signal L12) from the far-end transceiver 20 and the first audio signal L11, and outputs the resultant signal to the echo canceller 105 as the reference signal R11, and at the same time, to the speaker 103 as an output signal. At this time, the reference signal R11 is not the output signal, as it is, of the adder 2022, but is degenerated, by the signal degenerating unit 2032, so as to at least have the same sampling frequency as the sampling frequency of the second audio signal L12.

On the other hand, the control unit 107, when the signal X1 is OFF (when a reception signal is not received) and the signal Y1 is turned ON (when a TV signal is received), generates a control signal S11 for performing control to turn the two switches in the adding unit 202 to the upper side, and transmits the control signal 511 to the adding unit 202. This causes the adding unit 202 to turn the internal switches to the upper side. In this case, the first audio signal L11 received from the TV signal receiving unit 100 is transmitted to the speaker 103.

It is to be noted that, in this case, the reference signal is not generated, but two advantageous effects below are produced. That is, one advantageous effect is that it is possible to reproduce the TV signal from the speaker 103 without deteriorating the audio quality, by performing upsampling processing and the channel enlargement processing on the second audio signal L12 to convert the sampling frequency and the number of channels to be the same as those of the signal (the first audio signal L11) from the TV signal receiving unit 100. The other advantageous effect is that, since the reference signal R11 can be a narrowband, it is possible to reduce the amount of operation performed by the echo canceller 105.

As described above, the control unit 107 controls the adding unit 202 to make it possible, when a talker of the near-end transceiver 10 is not talking with a talker of the far-end transceiver 20, to cause the audio signal of the TV signal receiving unit 100 (the first audio signal L11) to be received by the talker of the near-end transceiver 10 as being the audio with the original broadband many channels. On the other hand, since it is possible to add the TV signal (the first audio signal L11) to the reference signal R11 provided to the echo canceller 105 when the talker of the near-end transceiver 10 is talking with the talker of the far-end transceiver 20, it is possible to prevent the TV audio that is received by the near-end transceiver 10 (the first audio signal L11 of the TV signal receiving unit 100) from being sent out to the far-end transceiver 20. In addition, since the TV audio reproduced from the speaker 103 is maintained to be a broadband signal in the above case as well, it is possible for the talker of the near-end transceiver 10 to receive a good sound.

With this, even when the same TV signal are received by the far-end side and the near-end side, the audio signal of the TV on the near-end side is not sent out to the far-end side, and thus it is possible to receive the TV signal well on the far-end side. In other words, even when the same TV signal is received by the far-end side and the near-end side, it is possible to suppress the state where as if an intense echo of the audio signal of TV returns to the far-end side.

It is to be noted that, when it is necessary for the reference signal R11 to be a monaural signal (when the echo canceller 105 corresponds to a monaural signal), although not illustrated in FIG. 11, the adder 2022 needs to render an output of addition to be monaural when an input is a multichannel signal of two or more channels.

In addition, the configuration of the speaker 103 explained in Embodiment 1 to Embodiment 4 is not particularly limited, but a speaker which, for example, is general, that is, a speaker intended to reproduce the entire frequency range of an input signal. However, the speaker 103 is, of course, not limited to this configuration. For example, for the increased audio quality of recent TV audio, a bass speaker which reproduces a bass sound portion faithfully as much as possible may separately be provided. The following describes a configuration example of the adding unit and the echo canceller in that case.

Figure 12:
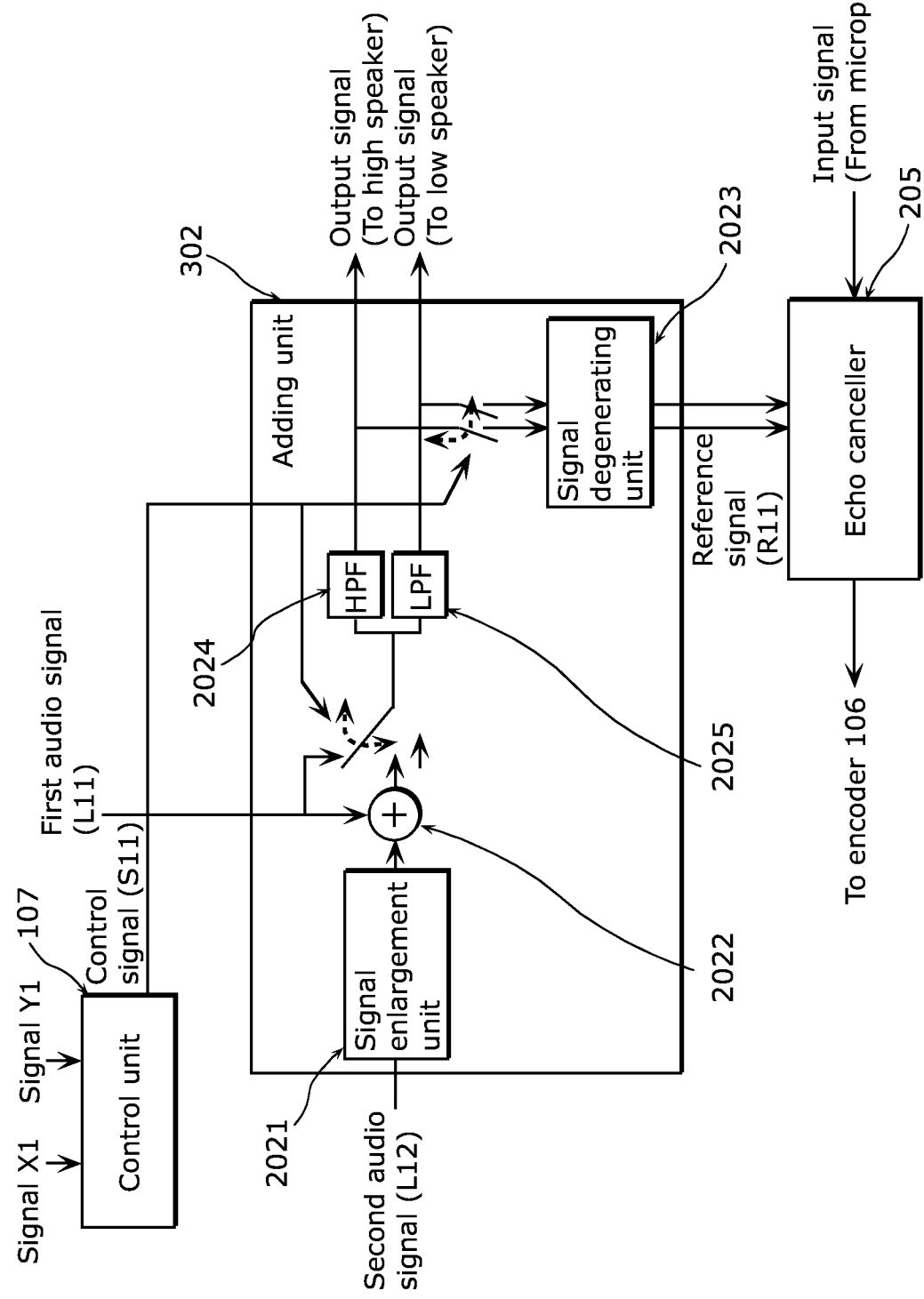
FIG. 12 is a diagram which illustrates a detailed configuration of an adding unit, a control unit, and an echo canceller when a speaker for each frequency band is included

FIG. 12 is a diagram which illustrates a detailed configuration of an adding unit, a control unit, and an echo canceller when a speaker for each frequency band is included. It is to be noted that elements identical to elements in FIG. 11 are provided with the same reference signs, and detailed explanation will be omitted.

FIG. 12 and FIG. 11 are substantially the same diagrams. The adding unit 302 illustrated in FIG. 12 is different from the adding unit 202 illustrated in FIG. 11 in that the adding unit 302 includes a highpass filter 2024 and a lowpass filter 2025 for separating an output signal to be a high speaker signal and a low speaker signal, and two reference signals are outputted which are a high reference signal and a low reference signal. In addition, FIG. 12 illustrates an echo canceller 205 which receives a reference signal of the adding unit 302.

As illustrated in FIG. 12, the output of the adder 2022 or the first audio signal L11 is separated, before transmitted to the speaker 103, to two signals processed by (i) a highpass filter 2024 of a predetermined cutoff frequency and a lowpass filter 2025 of a cutoff frequency determined according to that. Each of the signals is transmitted to the speaker 103 as well as to the signal degenerating unit 2023. The operations performed by the signal degenerating unit 2023 are the same as those described above, and thus descriptions for them will be omitted.

In addition, the echo canceller 205 can be configured in various ways in addition to the configurations described in Embodiments 1 to 3. One example is illustrated in FIG. 13.

Figure 13:
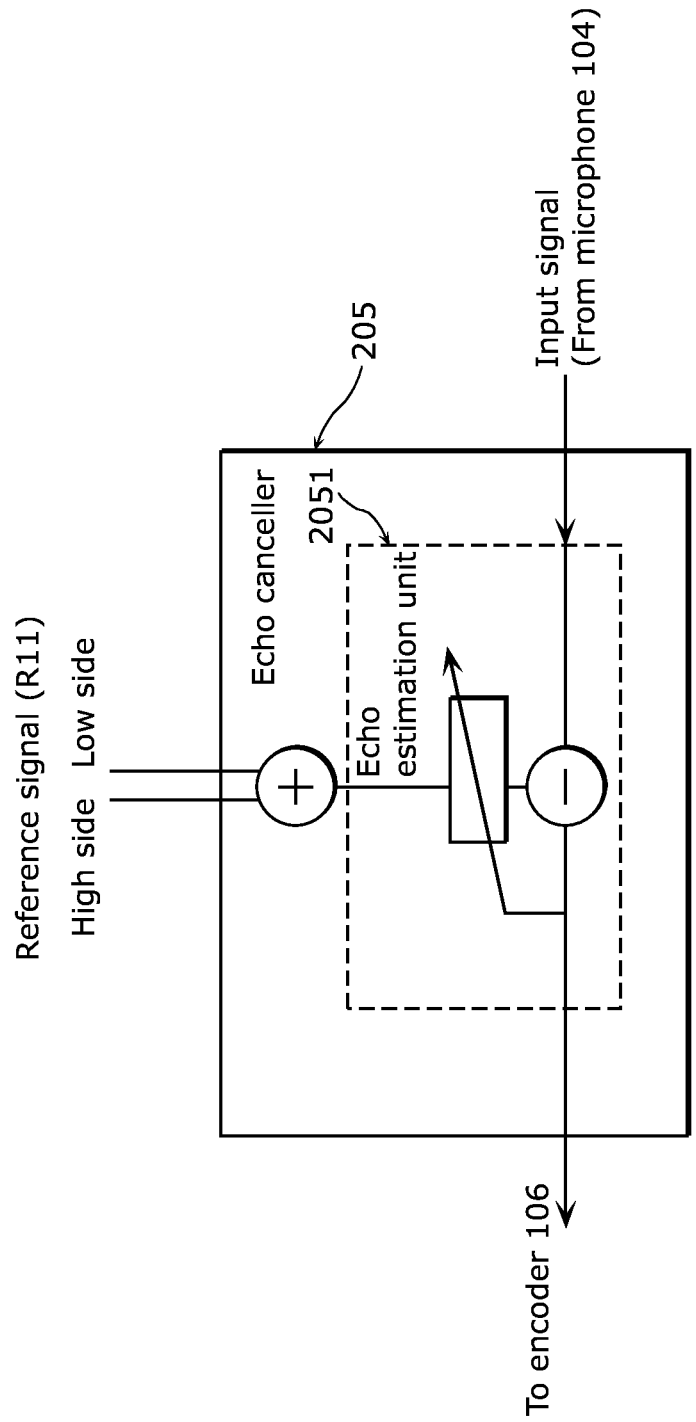
FIG. 13 is a diagram which illustrates a detailed configuration of the echo canceller when a speaker for each frequency band is included.

FIG. 13 is a diagram which illustrates a detailed configuration of the echo canceller when a speaker for each frequency band is included.

In the echo canceller 205 illustrated in FIG. 13, a high reference signal and a low reference signal are added up and transmitted to an echo estimation unit 2051, and the echo estimation unit 2051 subtracts a generated pseudo echo from an input signal, thereby canceling an echo. This is not the same as the case where a signal before processed by the highpass filter 2024 and the lowpass filter 2025 in FIG. 12 is used as the reference signal as it is. Although not illustrated in FIG. 12, signals processed by the highpass filter 2024 and the lowpass filter 2025 are respectively receive equalizer processing, auto gain control (AGC), or sound volume processing, according to the speaker characteristics and a user preference. For that reason, by using the high signal and the low signal immediately before outputted to the speaker 103 as reference signals, it is advantageous to generate a pseudo echo. Thus, by configuring the echo canceller 205 as illustrated in FIG. 13, the signal actually outputted from the speaker 103 and the signal inputted to the echo estimation unit 2051 as a reference signal become similar, and thus the accuracy in eco estimation improves as a result.

It is to be noted that, as illustrated in FIG. 13, when the echo canceller 205 is configured, the process of adding up the high reference signal and the low reference signal may be performed before the signal degenerating unit 2023 in FIG. 12.

Figure 14:
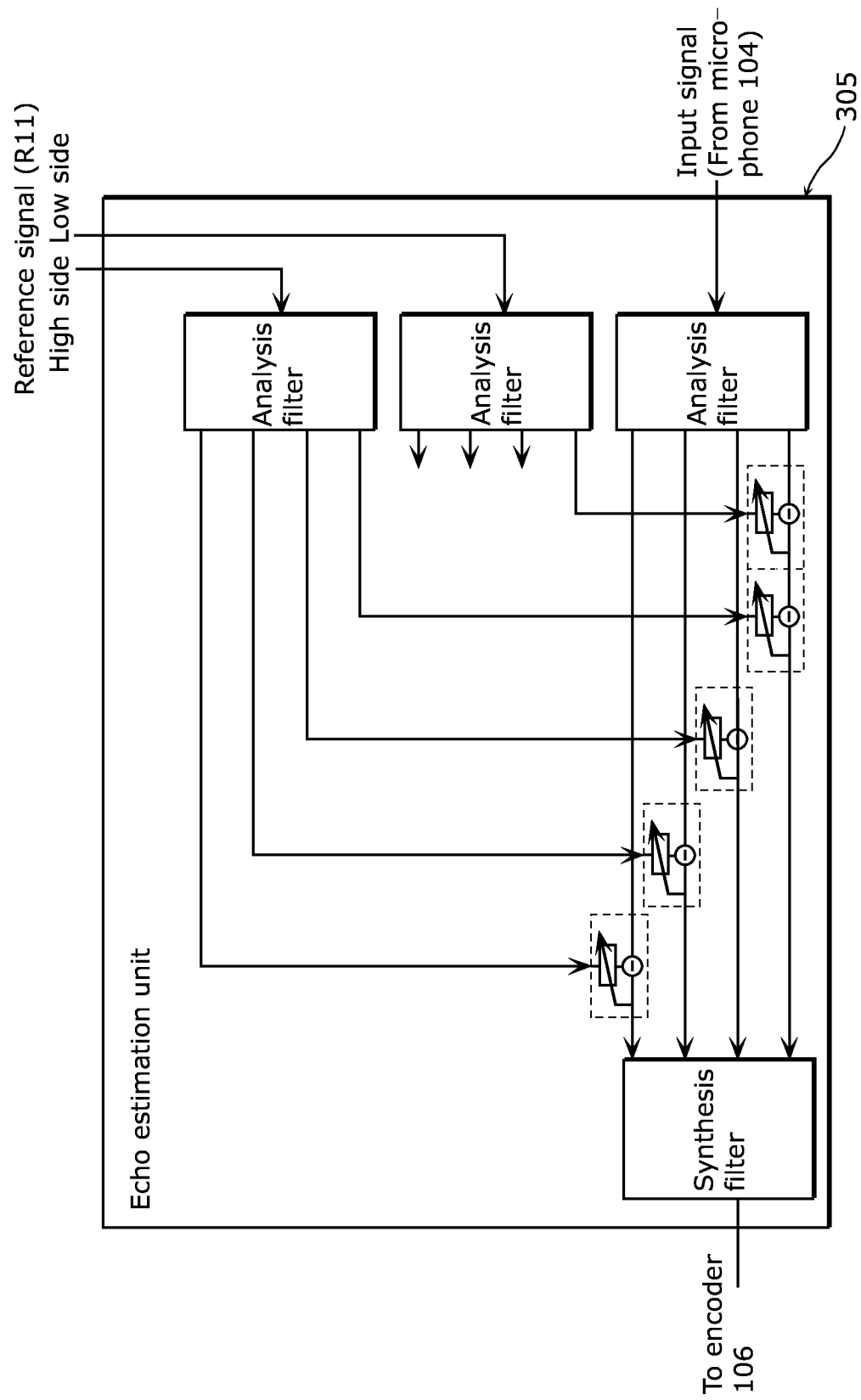
FIG. 14 is a diagram which illustrates another detailed configuration of the echo canceller when a speaker for each frequency band is included.

The following describes another configuration example of the echo canceller with reference to FIG. 14.

FIG. 14 is a diagram which illustrates another detailed configuration of the echo canceller when a speaker for each frequency band is included.

First, the echo canceller 305 illustrated in FIG. 14 uses a so-called subband echo canceling technique including subband separation and integration. More specifically, an input signal and a reference signal from the microphones 104 are respectively separated to subbands. FIG. 14 illustrates the case of four separations, however, it is merely an example. In other words, it may be separated into any number of bands.

Next, echo estimation is performed for each separated subband. In FIG. 14, as to the lowest-pass subband signal, echo estimation is first performed using the low reference signal, and echo cancellation is performed by subtracting a generated pseudo echo from the lowest-pass signal of an input signal. In addition, as to the lowest-pass signal, echo cancellation may be performed by using the high reference signal. This is because, for example, when the cutoff frequency of the high-pass filter 2024 or the lowpass filter 2025 is 300 Hz and the frequency range of the lowest-pass subband is from 0 to 1 kHz, the lowest-pass subband includes both of the high reference signal and the low reference signal. It should be obvious that there is no need to do so when the boundary line of the subband and the cutoff frequency are regarded as substantially the same frequencies.

On the other hand, echo cancellation may be performed on a middle-pass and a high-pass subbands using the high reference signal.

As described above, the echo cancellation is performed for each subband, and the bandwidth of a subband signal after the echo cancellation is synthesized to generate a signal of a general full bandwidth signal.

It is to be noted that the reason for performing the echo cancellation on the signal after subband separation is to reduce the amount of operation. However, with the method described above, an echo of a sound reproduced from the high speaker and an echo of a sound reproduced from the low speaker can be independently canceled, and thus it is possible to perform highly accurate echo cancellation with the amount of operation being maintained at a low level.

In addition, although a TV reception signal is treated in the present embodiment, it is necessary, in this case, to perform processing of delaying an audio signal for AV synchronization of the TV screen (so-called lip-sync). The following describes the case of causing the adding unit to perform the processing of lip-sync.

Figure 15:
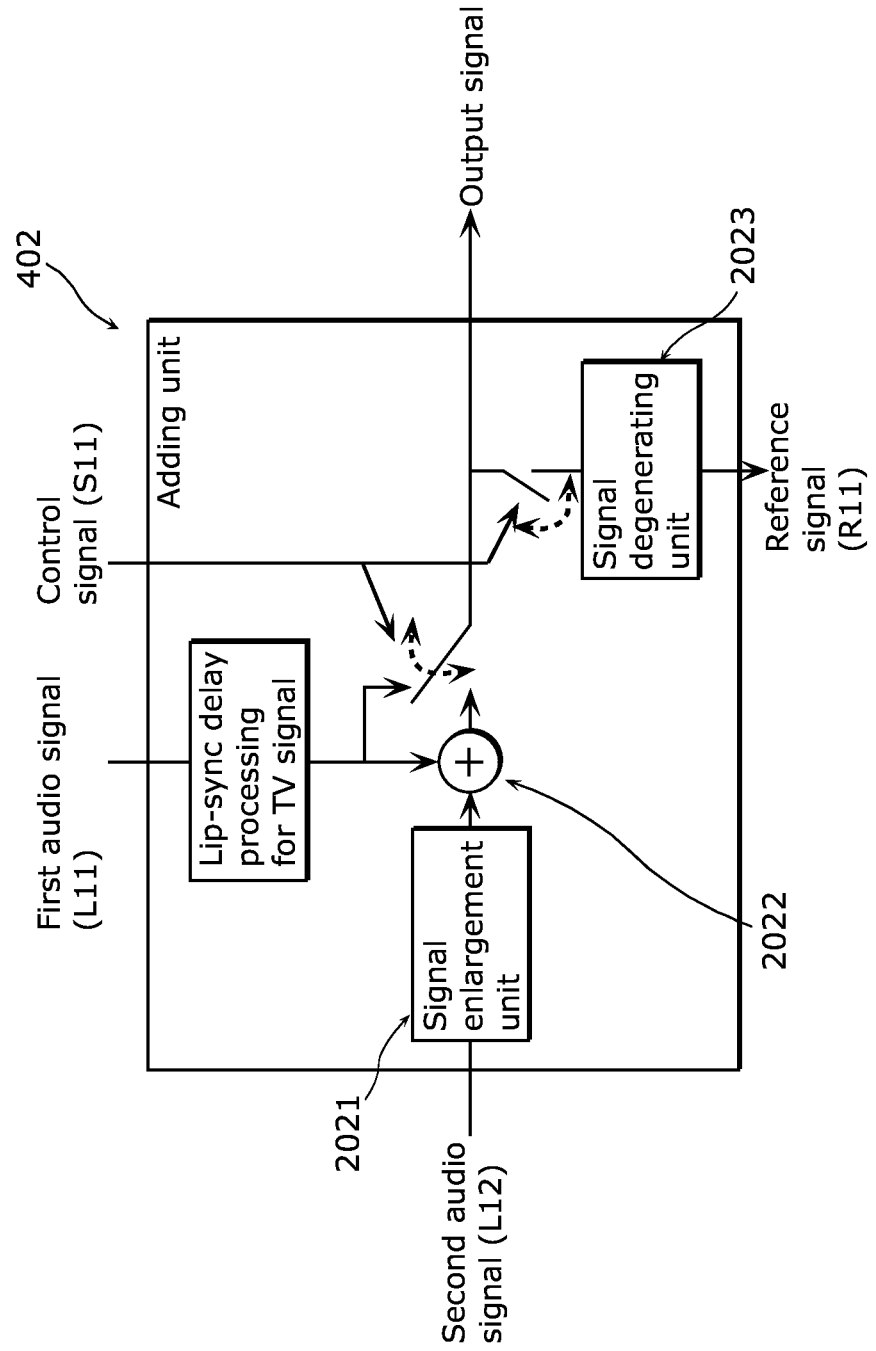
FIG. 15 is a diagram which illustrates a detailed configuration of the adding unit which performs delay processing for lip-sync.

FIG. 15 is a diagram which illustrates a detailed configuration of the adding unit which performs delay processing for lip-sync. It is to be noted that elements identical to elements in FIG. 11 are provided with the same reference signs, and detailed explanation will be omitted.

With the adding unit 402 illustrated in FIG. 15, it is beneficial to perform the delay processing for TV signal lip-sync prior to the adder 2022. This is because, since it is necessary to reduce delay as much as possible for a signal for voice communication, performing delay for Lip-sync after adding up the TV signal and the communication signal poses a problem for communication. As illustrated in FIG. 15, by providing the adding unit 402, it is possible to maintain lip-sync for the TV screen and prevent delay in the communication voice from occurring.

Meanwhile, when communication is carried out by a so-called video phone, lip-sync for communication screen is necessary in some cases. In such a case, it is of course beneficial to also place the delay for communication screen lip-sync prior to the adder.

It is to be noted that, in this Description, the term "TV" is not necessarily limited to a so-called television for wireless broadcasting. For example, it may be an AV signal distributed via the Internet or audio broadcasting (audio distribution) not including a video signal, regardless of wired or wireless. In addition, the announcement on a premise carried out at the same time in a school, workplace, commerce facility, and the like is included in this. In sum, all of the signals which are extensively broadcasted or distributed at the same time and include at least an audio signal are signals which can be treated by the present invention.

As described above, the transceiver according to the present invention has been described based on Embodiments, however, the present invention is not limited to these Embodiments. Other forms in which various modifications apparent to those skilled in the art are applied to the embodiments, or forms structured by combining structural elements of different embodiments may be included within the scope of the plurality of aspects, unless such changes and modifications depart from the scope of the present invention.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

For example, the above-described transceiver may be configured as an echo cancellation device including elements other than the speaker and the microphone. In this case, for example, an echo cancellation device which transmits an audio signal to a speaker and receives an input of a picked-up signal which is picked up by a microphone, the echo cancellation device including: a receiving unit which receives a broadcast wave and generate a first audio signal from the received broadcast wave; a decoding unit which decodes a reception signal received from a different transceiver, to generate a second audio signal; an adding unit which (i-a) transmits the first audio signal or the second audio signal to the speaker or (i-b) adds up, and transmit to the speaker, the first audio signal and the second audio signal, and (ii) outputs a reference signal; and an echo canceller which estimates a pseudo echo component from the reference signal and cancels the pseudo echo component in a picked-up signal obtained by picking up, using the microphone, a sound outputted from the speaker, wherein when the receiving unit is receiving the broadcast wave, the adding unit adds up, and transmits to the speaker, the first audio signal and the second audio signal, and outputs a signal resulting from adding up the first audio signal and the second audio signal, to the echo canceller as the reference signal. Here, for example, the echo cancellation device may further including a control unit which controls the adding unit, wherein when the receiving unit is receiving the broadcast wave and the different transceiver is receiving a same broadcast wave as the broadcast wave, the control unit causes the adding unit to: add up, and transmit to the speaker, the first audio signal and the second audio signal; and output a signal resulting from adding up the first audio signal and the second audio signal, to the echo canceller as the reference signal, and when the receiving unit is receiving the broadcast wave and the different transceiver is receiving a broadcast wave different from the broadcast wave, or when the receiving unit is receiving the broadcast wave and the different transceiver is not receiving a broadcast wave, the control unit causes the adding unit to: add up, and transmit to the speaker, the first audio signal and the second audio signal; and output the second audio signal to the echo canceller as the reference signal.

It is to be noted that, in the above-described Embodiments, each of the function blocks included in the transceiver, as illustrated in FIG. 1 for example, is implemented into a large scale integration (LSI) which is typically an integrated circuit. The function blocks may be integrated into individual chips or some or all of them may be integrated into one chip. Although referred to as the LSI here, the integrated circuit may be referred to as an integrated circuit (IC), a system LSI, a super LSI, or an ultra LSI depending on the degree of integration.

A method for circuit integration is not limited to application of an LSI. It may be implemented as a dedicated circuit or a general-purpose processor. It is also possible to use a Field Programmable Gate Array (FPGA) that can be programmed after the LSI is manufactured, or a reconfigurable processor in which connection and setting of circuit cells inside the LSI can be reconfigured.

Moreover, when a circuit integration technology that replaces LSIs comes along owing to advances of the semiconductor technology or to a separate derivative technology, the function blocks should be understandably integrated using that technology. There can be a possibility of adaptation of biotechnology, for example.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The transceiver according to the present invention has the functions of receiving a TV signal and a communication, and is capable of carrying out communication, even when the same program is received at the same time on the near end and the far end, without being bothered by the audio signals of TV on the both sides, and in other cases, it is possible to receive the audio signals of TV with a high audio quality of original TV, and thus it is applicable broadly as transceivers.

The invention claimed is:

1. A transceiver including at least a speaker and a microphone, the transceiver comprising:
a receiving unit configured to receive a broadcast wave and generate a first audio signal from the received broadcast wave;
a decoding unit configured to decode a reception signal received from a different transceiver, to generate a second audio signal;
an adding unit configured to (i-a) transmit the first audio signal or the second audio signal to the speaker or (i-b) add up and transmit, to the speaker, the first audio signal and the second audio signal, and (ii) output a reference signal;
an echo canceller which estimates a pseudo echo component from the reference signal and cancels the pseudo echo component in a picked-up signal obtained by picking up, using the microphone, a sound outputted from the speaker; and
a control unit configured to control the adding unit,
wherein when the receiving unit is receiving the broadcast wave, the adding unit is configured to add up and transmit, to the speaker, the first audio signal and the second audio signal and output, to the echo canceller, a signal resulting from adding up the first audio signal and the second audio signal as the reference signal,
when the receiving unit is receiving the broadcast wave and the different transceiver is receiving a same broadcast wave as the broadcast wave, the control unit is configured to cause the adding unit to: add up and transmit, to the speaker, the first audio signal and the second audio signal; and output, to the echo canceller, the signal resulting from adding up the first audio signal and the second audio signal as the reference signal, and
when the receiving unit is receiving the broadcast wave and the different transceiver is receiving a broadcast wave different from the broadcast wave, or when the receiving unit is receiving the broadcast wave and the different transceiver is not receiving a broadcast wave, the control unit is configured to cause the adding unit to: add up and transmit, to the speaker, the first audio signal and the second audio signal; and output the second audio signal to the echo canceller as the reference signal.

2. The transceiver according to claim 1,
wherein the control unit is configured to determine, based on an identifying signal of the broadcast wave being received by the receiving unit, whether or not the receiving unit is receiving the broadcast wave, and
the control unit is configured to determine, based on an identifying signal of the broadcast wave being received by the different transceiver, whether or not the different transceiver is receiving a same broadcast wave as the broadcast wave being received by the receiving unit.

3. The transceiver according to claim 1, wherein the adding unit is configured to:
when the receiving unit is receiving the broadcast wave and the different transceiver is receiving a same broadcast wave as the broadcast wave, (i) add up and transmit, to the speaker, the first audio signal and the second audio signal by converting a sampling frequency of the first audio signal to obtain a signal having a sampling frequency of the second audio signal, and then adding the signal to a signal having the sampling frequency of the second audio signal, and (ii) output a signal resulting from adding up the first audio signal converted into the signal having the sampling frequency of the second audio signal and the second audio signal, to the echo canceller as the reference signal, and
when the receiving unit is receiving the broadcast wave and the different transceiver is receiving a broadcast wave different from the broadcast wave, or when the receiving unit is receiving the broadcast wave and the different transceiver is not receiving a broadcast wave, (i) add up and transmit, to the speaker, the first audio signal and the second audio signal by converting a sampling frequency of the second audio signal to obtain a signal having a sampling frequency of the first audio signal, and then adding the signal to a signal having the sampling frequency of the first audio signal, and (ii) output the second audio signal converted into the signal having the sampling frequency of the first audio signal, to the echo canceller as the reference signal.

4. The transceiver according to claim 1, wherein the adding unit is configured to:
when the receiving unit is receiving the broadcast wave and the different transceiver is receiving a same broadcast wave as the broadcast wave, (i) add up and transmit, to the speaker, the first audio signal and the second audio signal by converting the number of channels of the first audio signal to obtain a signal having the number of channels of the second audio signal, and then adding the signal to a signal having the number of channels of the second audio signal, and (ii) output a signal resulting from adding up the first audio signal converted into the signal having the number of channels of the second audio signal and the second audio signal, to the echo canceller as the reference signal; and when the receiving unit is receiving the broadcast wave and the different transceiver is receiving a broadcast wave different from the broadcast wave, or when the receiving unit is receiving the broadcast wave and the different transceiver is not receiving a broadcast wave, (i) add up and transmit, to the speaker, the first audio signal and the second audio signal by converting the number of channels of the second audio signal to obtain a signal having the number of channels of the first audio signal, and then adding the signal to a signal having the number of channels of the first audio signal, and (ii) output the second audio signal converted into the signal having the number of channels of the first audio signal, to the echo canceller as the reference signal.

5. A transceiver including at least a speaker and a microphone, the transceiver comprising:
   a receiving unit configured to receive a broadcast wave and generate a first audio signal from the received broadcast wave;
   a decoding unit configured to decode a reception signal received from a different transceiver, to generate a second audio signal;
   an adding unit configured to add up, and transmit to the speaker, the first audio signal and the second audio signal, and output a reference signal; and
   an echo canceller which estimates a pseudo echo component from the reference signal and cancels the pseudo echo component in a picked-up signal obtained by picking up, using the microphone, a sound outputted from the speaker,
   wherein the adding unit includes a first sound volume adjusting unit configured to adjust a sound volume of the first audio signal, and a second sound volume adjusting unit configured to adjust a sound volume of the second audio signal, and
   when the receiving unit is receiving the broadcast wave and outputs the second audio signal to the echo canceller as the reference signal, the adding unit is configured to add up, and transmit to the speaker, the second audio signal and the first audio signal having an output level lower than an output level of the second audio signal, by lowering the output level of the first sound volume adjusting unit to be lower than the output level of the second sound volume adjusting unit.

6. The transceiver according to claim 5, wherein the output level of the first sound volume adjusting unit is 0.

7. A transceiver including at least a speaker and a microphone which picks up at least a first audio signal when a receiver for receiving a broadcast wave outputs the first audio signal, the transceiver comprising:
   a decoding unit configured to decode a reception signal received from a different transceiver, to generate a second audio signal;
   a first echo canceller which estimates a first pseudo echo component from a first reference signal, and cancels the first pseudo echo component in a picked-up signal obtained by picking up, using the microphone, a sound outputted from at least the speaker; and
   a second echo canceller which estimates a second pseudo echo component, using, as a second reference signal, the picked-up signal in which the first pseudo echo component is canceled by the first echo canceller, and cancels the second pseudo echo component in the second audio signal,
   wherein when the different transceiver picks up an audio signal outputted from a different receiver which receives a broadcast wave,
   the decoding unit is configured to generate the second audio signal including a third audio signal of the different transceiver,
   the first echo canceller cancels the first pseudo echo component in a picked-up signal obtained by picking up, using the microphone, a sound outputted from the speaker and the first audio signal outputted from the receiver,
   the second echo canceller cancels the second pseudo echo component in the second audio signal, the second pseudo echo component including the third audio signal of the different transceiver, and
   the first reference signal is the second audio signal in which the second pseudo echo component is cancelled by the second echo canceller.

8. The transceiver according to claim 7, wherein when the different transceiver picks up an audio signal outputted from a receiver which receives a same broadcast wave as the broadcast wave, the second audio signal is substantially identical to the first audio signal.

9. A transceiver including at least a speaker and a microphone, the transceiver comprising:
   a receiving unit configured to receive a broadcast wave and generate a first audio signal from the received broadcast wave;
   a decoding unit configured to decode a reception signal received from a different transceiver, to generate a second audio signal;
   an adding unit configured to (i-a) transmit the first audio signal or the second audio signal to the speaker or (i-b) add up and transmit, to the speaker, the first audio signal and the second audio signal, and (ii) output a reference signal; and
   an echo canceller which estimates a pseudo echo component from the reference signal and cancels the pseudo echo component in a picked-up signal obtained by picking up, using the microphone, a sound outputted from the speaker,
   wherein when the receiving unit is receiving the broadcast wave, the adding unit is configured to add up and transmit, to the speaker, the first audio signal and the second audio signal, and output, to the echo canceller, a signal resulting from adding up the first audio signal and the second audio signal as the reference signal, and
   the adding unit is configured to:
   when the receiving unit is receiving the broadcast wave and the decoding unit decodes a reception signal received from a different transceiver, (i) add up and transmit, to the speaker, the first audio signal and the second audio signal by converting a sampling frequency of the first audio signal to obtain a signal having a sampling frequency of the second audio signal, and then adding the signal to a signal having the sampling frequency of the second audio signal, and (ii) output a signal resulting from adding up the first audio signal converted into the signal having the sampling frequency of the second audio signal and the second audio signal, to the echo canceller as the reference signal; and when the receiving unit is receiving the broadcast wave and the decoding unit does not decode the reception signal received from the different transceiver, transmit the first audio signal to the speaker.

10. A transceiver including at least a speaker and a microphone, the transceiver comprising:
- a receiving unit configured to receive a broadcast wave and generate a first audio signal from the received broadcast wave:
- a decoding unit configured to decode a reception signal received from a different transceiver, to generate a second audio signal;
- an adding unit configured to (i-a) transmit the first audio signal or the second audio signal to the speaker or (i-b) add up and transmit, to the speaker, the first audio signal and the second audio signal, and (ii) output a reference signal; and
- an echo canceller which estimates a pseudo echo component from the reference signal and cancels the pseudo echo component in a picked-up signal obtained by picking up, using the microphone, a sound outputted from the speaker,
- wherein when the receiving unit is receiving the broadcast wave, the adding unit is configured to add up and transmit, to the speaker, the first audio signal and the second audio signal, and output, to the echo canceller, a signal resulting from adding up the first audio signal and the second audio signal as the reference signal, and the adding unit is configured to:
when the receiving unit is receiving the broadcast wave and the decoding unit decodes a reception signal received from the different transceiver, (i) add up and transmit, to the speaker, the first audio signal and the second audio signal by converting the number of channels of the first audio signal to obtain a signal having the number of channels of the second audio signal, and then adding the signal to a signal having the number of channels of the second audio signal, and (ii) output a signal resulting from adding up the first audio signal converted into the signal having the number of channels of the second audio signal and the second audio signal, to the echo canceller as the reference signal; and
when the receiving unit is receiving the broadcast wave and the decoding unit does not decode the reception signal received from the different transceiver, transmit the first audio signal to the speaker.

11. A transceiver including at least a speaker and a microphone, the transceiver comprising:
- a receiving unit configured to receive a broadcast wave and generate a first audio signal from the received broadcast wave;
- a decoding unit configured to decode a reception signal received from a different transceiver, to generate a second audio signal;
- an adding unit configured to (i-a) transmit the first audio signal or the second audio signal to the speaker or (i-b) add up and transmit, to the speaker, the first audio signal and the second audio signal, and (ii) output a reference signal; and
- an echo canceller which estimates a pseudo echo component from the reference signal and cancels the pseudo echo component in a picked-up signal obtained by picking up, using the microphone, a sound outputted from the speaker,
- wherein when the receiving unit is receiving the broadcast wave, the adding unit is configured to add up and transmit, to the speaker, the first audio signal and the second audio signal, and output, to the echo canceller, a signal resulting from adding up the first audio signal and the second audio signal as the reference signal, and the adding unit is configured to:
when the receiving unit is receiving the broadcast wave and the decoding unit decodes a reception signal received from a different transceiver, (i) add up and transmit, to the speaker, the first audio signal and the second audio signal by converting a sampling frequency of the second audio signal to obtain a signal having a sampling frequency of the first audio signal, and then adding the signal to the first audio signal, and (ii) convert, and output to the echo canceller as the reference signal, a signal resulting from adding up: the second audio signal converted into the signal having a sampling frequency of the first audio signal; and the first audio signal, to have the sampling frequency of the second audio signal; and
when the receiving unit is receiving the broadcast wave and the decoding unit does not decode the reception signal received from the different transceiver, transmit the first audio signal to the speaker.

12. A transceiver including at least a speaker and a microphone, the transceiver comprising:
- a receiving unit configured to receive a broadcast wave and generate a first audio signal from the received broadcast wave;
- a decoding unit configured to decode a reception signal received from a different transceiver, to generate a second audio signal;
- an adding unit configured to (i-a) transmit the first audio signal or the second audio signal to the speaker or (i-b) add up and transmit, to the speaker, the first audio signal and the second audio signal, and (ii) output a reference signal; and
- an echo canceller which estimates a pseudo echo component from the reference signal and cancels the pseudo echo component in a picked-up signal obtained by picking up, using the microphone, a sound outputted from the speaker,
- wherein when the receiving unit is receiving the broadcast wave, the adding unit is configured to add up and transmit, to the speaker, the first audio signal and the second audio signal, and output, to the echo canceller, a signal resulting from adding up the first audio signal and the second audio signal as the reference signal, and the adding unit is configured to:
when the receiving unit is receiving the broadcast wave and the decoding unit decodes a reception signal received from a different transceiver, (i) add up, and transmit to the speaker, the first audio signal and the second audio signal by converting the number of channels of the second audio signal to obtain a signal having the number of channels of the first audio signal, and then adding the signal to the first audio signal, and (ii) convert, and output to the echo canceller as the reference signal, a signal resulting from adding up: the second audio signal converted into the signal having the number of channels of the first audio signal; and the first audio signal, to have the number of channels of the second audio signal; and
when the receiving unit is receiving the broadcast wave and the decoding unit does not decode the reception signal received from the different transceiver, transmit the first audio signal to the speaker.

13. A transceiver including at least a speaker and a microphone, the transceiver comprising:
- a receiving unit configured to receive an input of an audio stream and generate a first audio signal from the audio stream;
- a decoding unit configured to decode a reception signal received from a different transceiver, to generate a second audio signal;
- an adding unit configured to (i-a) transmit the first audio signal or the second audio signal to the speaker or (i-b) add up and transmit, to the speaker, the first audio signal and the second audio signal, and (ii) output a reference signal;
- an echo canceller which estimates a pseudo echo component from the reference signal and cancels the pseudo echo component in a picked-up signal obtained by picking up, using the microphone, a sound outputted from the speaker; and
- a control unit configured to control the adding unit,
- wherein when the receiving unit is receiving the audio stream, the adding unit is configured to add up, and transmit to the speaker, the first audio signal and the second audio signal, and output a signal resulting from adding up the first audio signal and the second audio signal, to the echo canceller as the reference signal,
- (i) when the receiving unit is receiving the audio stream and the different transceiver is receiving a same audio stream as the audio stream, the control unit is configured to cause the adding unit to: add up, and transmit to the speaker, the first audio signal and the second audio signal; and transmit a signal resulting from adding up the first audio signal and the second audio signal, to the echo canceller as the reference signal, and
- (ii) when the receiving unit is receiving the audio stream and the different transceiver is receiving an audio stream different from the audio stream, or when the receiving unit is receiving the audio stream and the different transceiver is not receiving an audio stream, the control unit is configured to cause the adding unit to: add up, and transmit to the speaker, the first audio signal and the second audio signal; and output the second audio signal to the echo canceller as the reference signal.

14. An echo cancellation device which transmits an audio signal to a speaker and receives an input of a picked-up signal which is picked up by a microphone, the echo cancellation device comprising:
- a receiving unit configured to receive a broadcast wave and generate a first audio signal from the received broadcast wave;
- a decoding unit configured to decode a reception signal received from a different transceiver, to generate a second audio signal;
- an adding unit configured to (i-a) transmit the first audio signal or the second audio signal to the speaker or (i-b) add up, and transmit to the speaker, the first audio signal and the second audio signal, and (ii) output a reference signal;
- an echo canceller which estimates a pseudo echo component from the reference signal and cancels the pseudo echo component in a picked-up signal obtained by picking up, using the microphone, a sound outputted from the speaker; and
- a control unit configured to control the adding unit,
- wherein when the receiving unit is receiving the broadcast wave, the adding unit is configured to add up, and transmit to the speaker, the first audio signal and the second audio signal, and output a signal resulting from adding up the first audio signal and the second audio signal, to the echo canceller as the reference signal,
- when the receiving unit is receiving the broadcast wave and the different transceiver is receiving a same broadcast wave as the broadcast wave, the control unit is configured to cause the adding unit to: add up, and transmit to the speaker, the first audio signal and the second audio signal; and output a signal resulting from adding up the first audio signal and the second audio signal, to the echo canceller as the reference signal, and
- when the receiving unit is receiving the broadcast wave and the different transceiver is receiving a broadcast wave different from the broadcast wave, or when the receiving unit is receiving the broadcast wave and the different transceiver is not receiving a broadcast wave, the control unit is configured to cause the adding unit to: add up, and transmit to the speaker, the first audio signal and the second audio signal; and output the second audio signal to the echo canceller as the reference signal.

* * * * *